(12) United States Patent
Happel

(10) Patent No.: US 9,340,965 B2
(45) Date of Patent: May 17, 2016

(54) STORM WATER VAULT HAVING AN ARTICULATED FLOATING SCREEN FILTER SYSTEM

(71) Applicant: Thomas H Happel, Cocoa, FL (US)

(72) Inventor: Thomas H Happel, Cocoa, FL (US)

(*) Notice: Subject to any disclaimer, the term of this patent is extended or adjusted under 35 U.S.C. 154(b) by 194 days.

(21) Appl. No.: 14/097,302

(22) Filed: Dec. 5, 2013

(65) Prior Publication Data

US 2014/0158598 A1     Jun. 12, 2014

Related U.S. Application Data

(60) Provisional application No. 61/735,277, filed on Dec. 10, 2012.

(51) Int. Cl.
| | |
|---|---|
| *E03F 5/04* | (2006.01) |
| *E03F 5/14* | (2006.01) |
| *E03F 5/12* | (2006.01) |
| *C02F 1/00* | (2006.01) |
| *C02F 103/00* | (2006.01) |

(52) U.S. Cl.
CPC .......... *E03F 5/14* (2013.01); *E03F 5/0404* (2013.01); *E03F 5/125* (2013.01); *C02F 1/004* (2013.01); *C02F 2103/001* (2013.01); *C02F 2303/24* (2013.01)

(58) Field of Classification Search
CPC ......... E03F 5/0404; E03F 5/046; E03F 5/125; E03F 5/14; C02F 2103/001; C02F 2303/24
USPC ............................ 210/122, 162, 163, 170.03
See application file for complete search history.

(56) References Cited

U.S. PATENT DOCUMENTS

| | | | |
|---|---|---|---|
| 6,270,663 B1 | 8/2001 | Happel | |
| 6,379,541 B1* | 4/2002 | Nicholas | 210/162 |
| 6,428,692 B2 | 8/2002 | Happel | |
| 6,478,954 B1* | 11/2002 | Turner et al. | 210/162 |
| 6,797,162 B2 | 9/2004 | Happel | |
| 6,869,525 B1 | 3/2005 | Happel | |
| 6,979,148 B2 | 12/2005 | Happel et al. | |
| 7,153,417 B2 | 12/2006 | Happel | |
| 7,270,747 B2* | 9/2007 | Happel et al. | 210/162 |
| 7,549,820 B1 | 6/2009 | Happel | |
| 7,785,464 B2 | 8/2010 | Happel | |
| 7,846,327 B2 | 12/2010 | Happel et al. | |
| 7,959,799 B2 | 6/2011 | Happel et al. | |
| 7,981,283 B2 | 7/2011 | Happel | |
| 8,034,234 B2 | 10/2011 | Happel | |
| 8,034,236 B1 | 10/2011 | Happel | |
| 8,034,237 B2 | 10/2011 | Happel et al. | |
| 8,083,937 B2 | 12/2011 | Happel | |
| 8,216,453 B2 | 7/2012 | Moody et al. | |
| 8,231,780 B2 | 7/2012 | Happel | |
| 8,491,797 B1* | 7/2013 | Happel | 210/170.03 |
| 2011/0168612 A1* | 7/2011 | Happel | 210/122 |
| 2013/0228527 A1* | 9/2013 | Crasti | 210/170.03 |

* cited by examiner

*Primary Examiner* — Christopher Upton
(74) *Attorney, Agent, or Firm* — William M. Hobby, III

(57) ABSTRACT

A storm water nutrient separating vault has a floatable filter basket therein for collecting debris entering the storm water filter vault which basket rises and falls with the water level in the vault. The floatable filter basket has a pair of swiveling trucks attached thereto. Each truck is supported on a generally vertical track mounted to a wall of the vault on one side of the vault's inlet and has a plurality of rollers riding in the track. The floatable filter basket can therefore swivel or tilt while rising or falling with the water level in the vault to maintain an opening in the nutrient collecting basket in front of the vault's inlet for capturing floating debris in the storm water entering the vault.

15 Claims, 26 Drawing Sheets

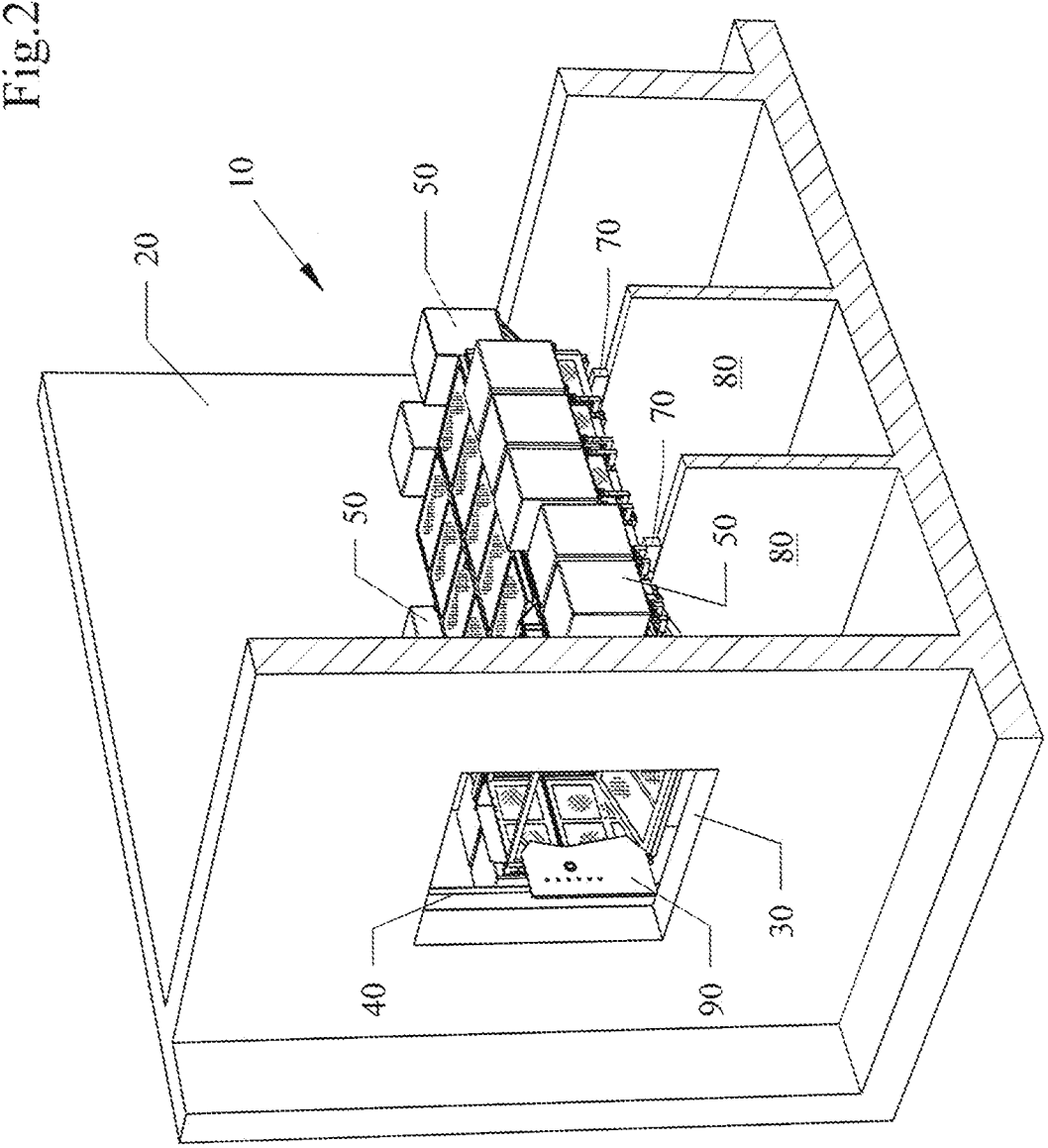

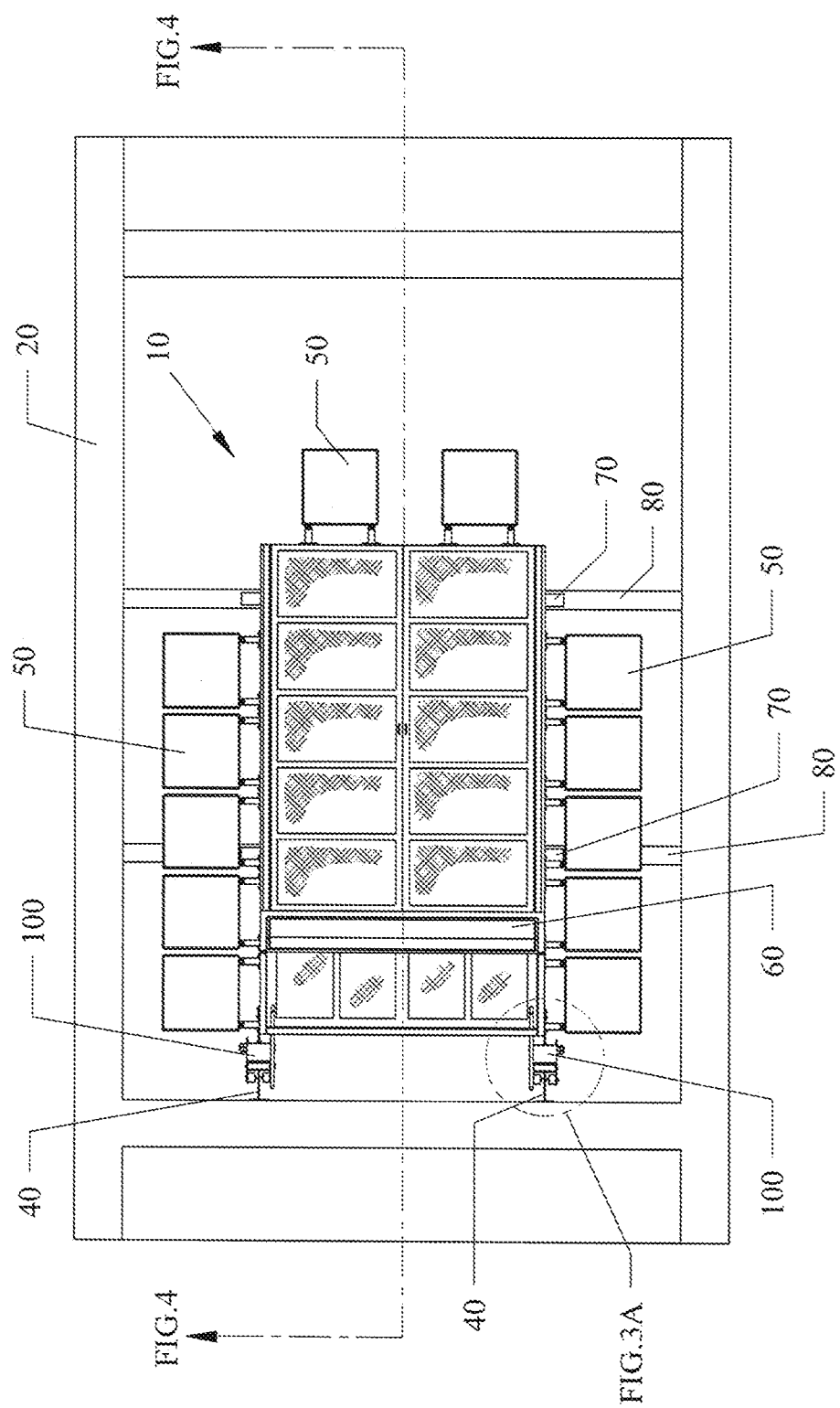

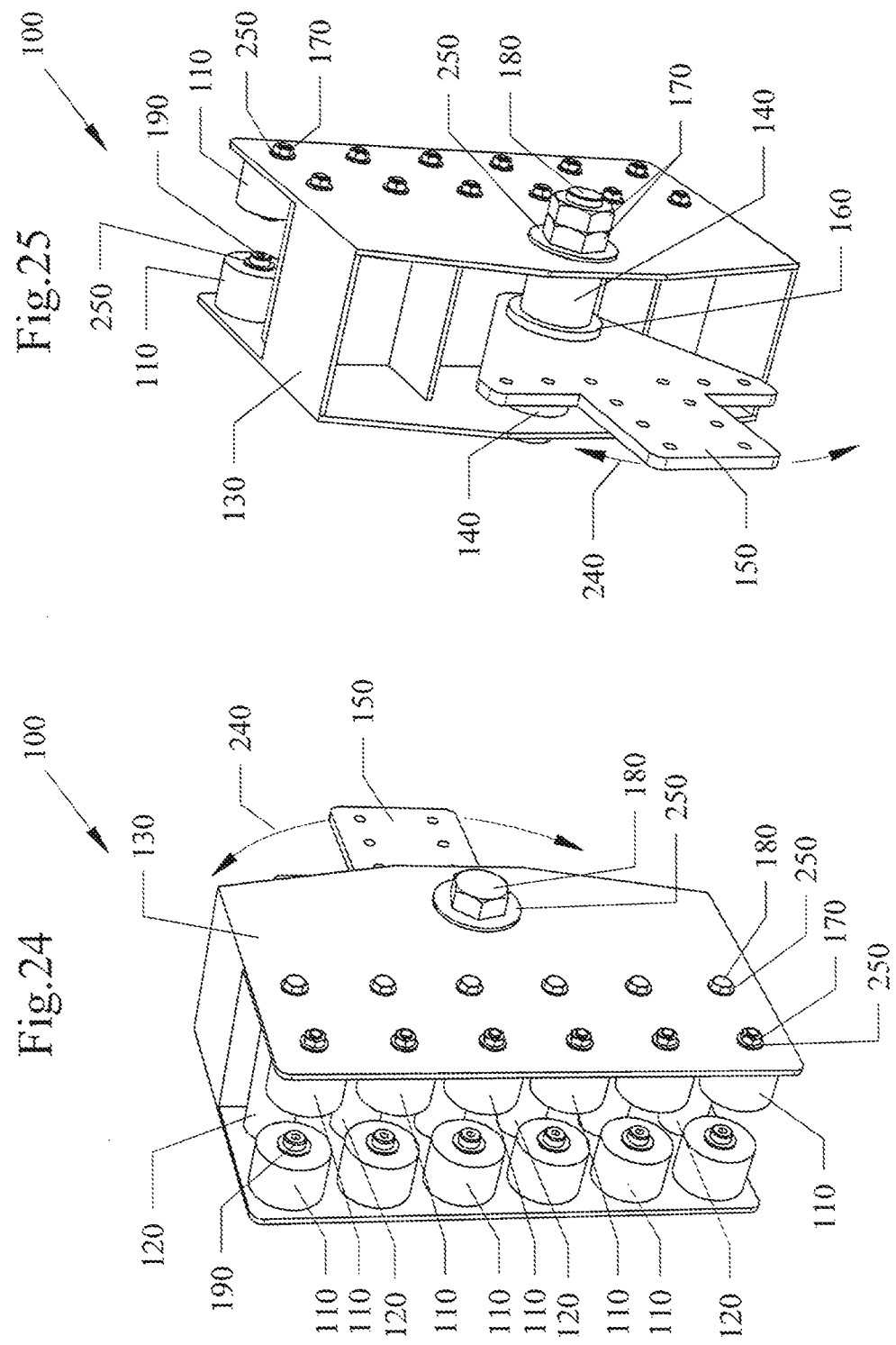

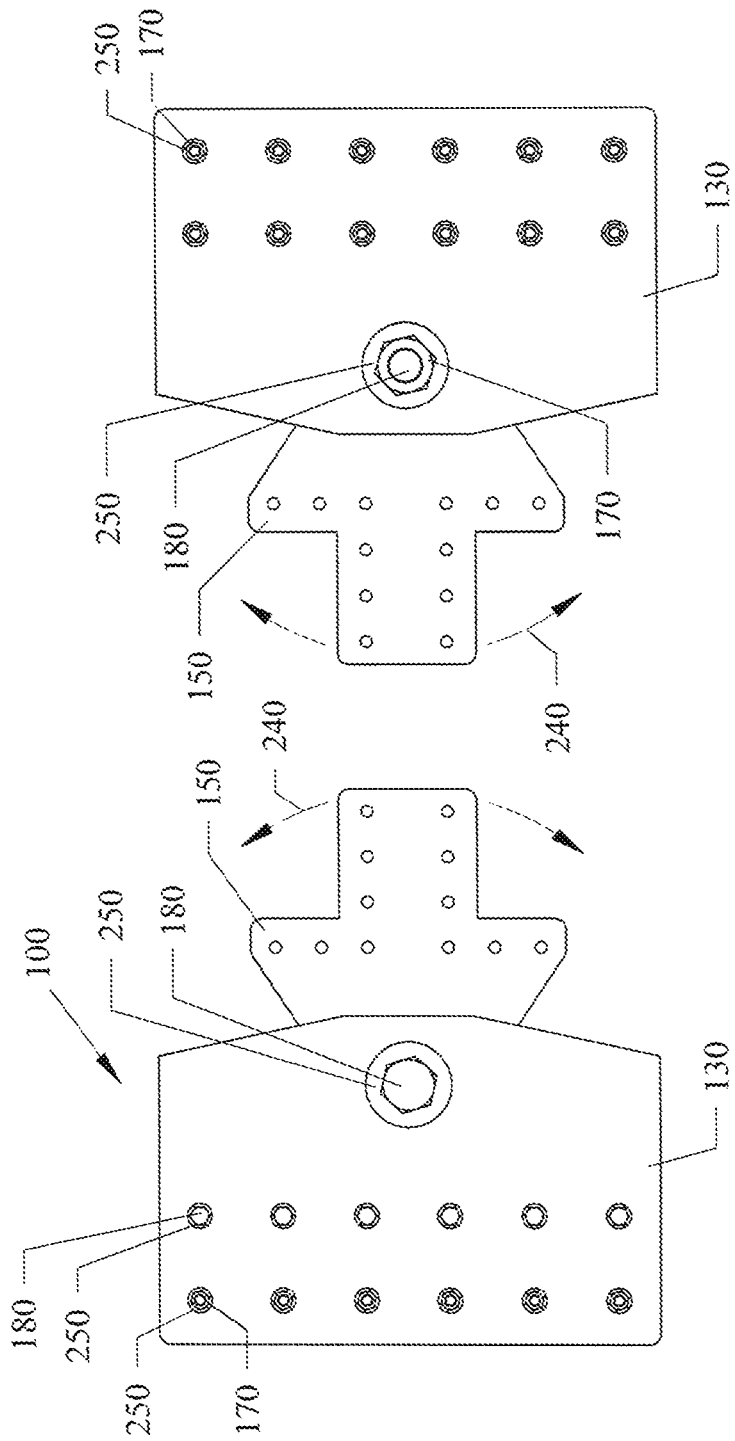

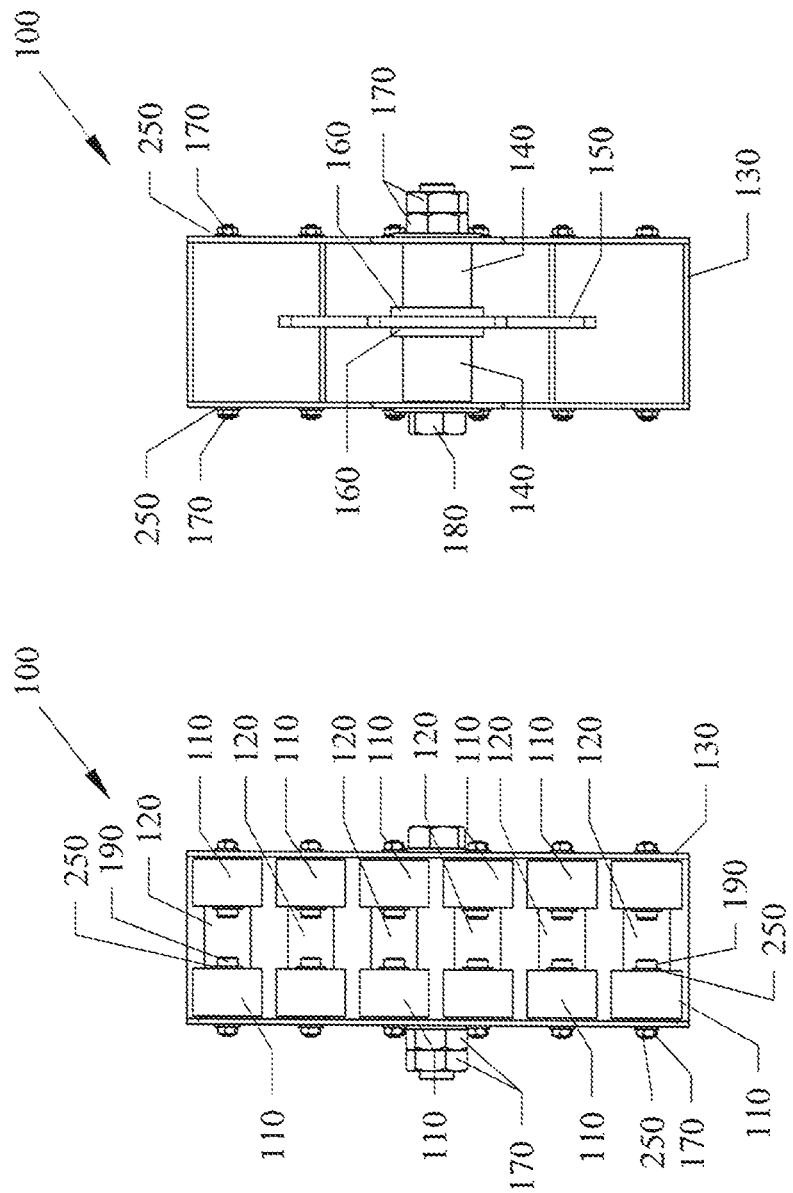

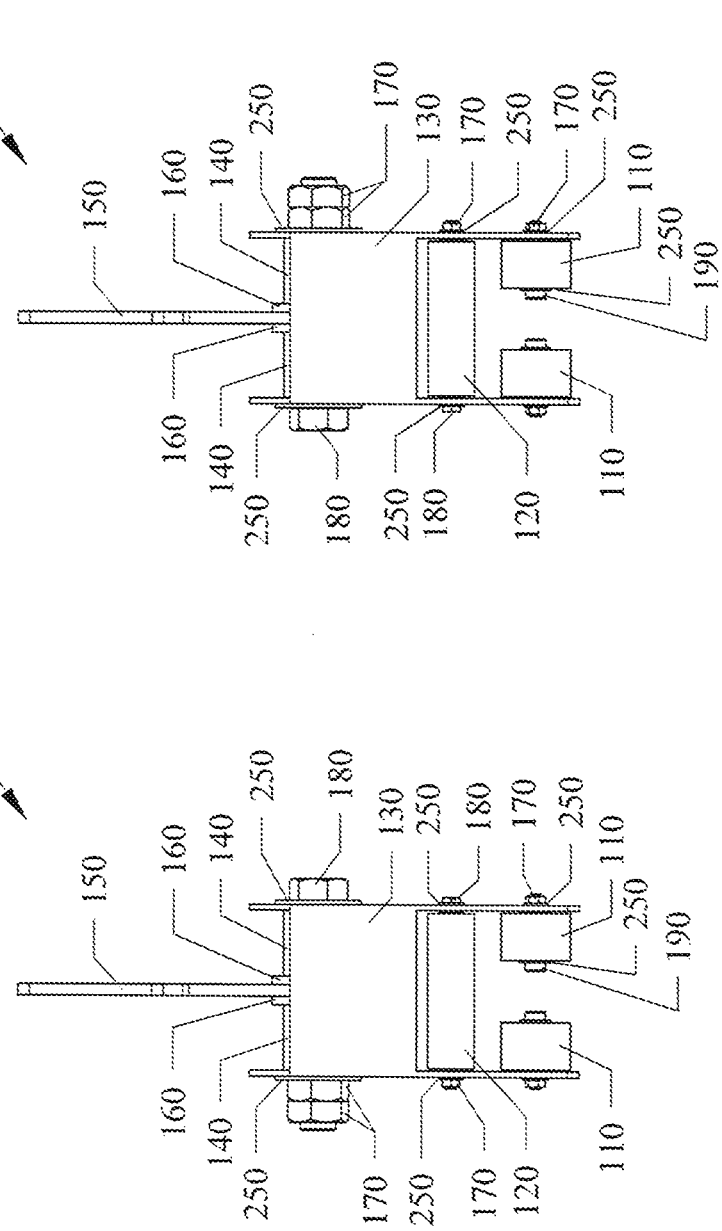

ent separating vault having an articulating floating filter basket for collecting
STORM WATER VAULT HAVING AN ARTICULATED FLOATING SCREEN FILTER SYSTEM This application claims the benefit of U.S. Provisional application No. 61/735,277, filed Dec. 10, 2012.

BACKGROUND OF THE INVENTION

This invention relates to a storm water nutrient separating vault having an articulating floating filter basket for collecting debris entering the vault and especially to a swiveling floating filter basket supported in a storm water vault with a plurality of swiveling roller trucks riding on a pair of tracks mounted on each side of the storm water inlet to the storm water nutrient separating vault to support and guide the floating screen basket as it moves with the level of water in the vault.

The objective of the Nutrient Separating Baffle Box is to treat a storm drain pipe by capturing contaminates such as foliage, litter, and sediments, and lighter than water liquids such as petroleum products. During a rain event as water flows into the Nutrient Separating Baffle Box, floatables such as foliage and litter are captured in the screen system, and sediments which are heavier than water, settle in the lower baffled settling chambers. After the rain event is over the hydraulic grade line of the water in the Nutrient Separating Baffle Box lowers to a level that is even with the tops of the baffles which is below the bottom of the screen system. This allows for the captured debris in the screen system to dry out between rain events, and not allow the nutrients in the captured foliage to leach into the water and become food for bacterial growth. The result of removing pollutants from the storm water flow prevents the conveyance of these pollutants into downstream bodies of water such as lakes, rivers, streams, etc.

This process of treating the water flow can create headloss which could impede the flow and reduce the rate of flow. If the treatment results in a significant reduction in the rate of flow, it is possible for flooding to occur upstream from the storm water treatment structure. Minimizing the headloss caused by a treatment system is important, especially when a treatment system is retrofitted to an existing drain pipe.

The Nutrient Separating Baffle Box (NSBB) provides treatment with minimal headloss by providing a non-obstructed conveyance for water flow through the vault that is equal or greater than the cross-sectional area of the inflow pipe below the ceiling of the inflow pipe. In most applications, it is not practical to make use of a tall screen system that may block off water flow if the screen becomes obstructed. A floating screen system of limited vertical height would be able to move with the changing water level to capture floatables moving near the surface of the water.

If the screen system is relatively short compared to the pipe size to minimize head loss, the screen system could float up during large flows so that it remains in line with the water level while allowing water to bypass under the screen system. This would enable the screen system to continue capturing floatables throughout a high flowing rain event.

The screen system would be able to automatically move vertically with a changing water level that is influenced by tides. Tides along the coasts of the continental US vary as much as 11 feet, and many storm water outfall pipes are below the coastal water level for much of the time. If the storm water treatment system is adjacent to a lake, the screen system would be able to automatically move with the changing lake level. It is common for lake levels to vary significantly depending on the time of year.

Applicant's prior U.S. patents which involve filter baskets may be seen in U.S. Pat. No. 7,981,283 for an Adjustable Filter Basket for Storm Water Drain System which has a nutrient separating filter basket for a storm water drain pipe which adjusts the height of the filter basket manually for catching floating debris entering a catch basin. U.S. Pat. No. 7,153,417 is for a floating storm water drain basket which adjusts for the height of the water in a housing. A scoop formed on the front end of the filter basket is positioned to face the inlet to the housing for capturing floating debris entering the housing. Floats are attached to the filter basket to position the basket for varying water levels in the housing.

U.S. Pat. No. 7,846,327 teaches a Storm Water Filter System having a Floating Skimmer Apparatus for preventing floatable debris from entering a filter box outlet. The portable skimmer is positioned in the box between the inlet and outlet to the box and keeps the skimmer above the water level in the box to keep floating debris from entering the outlet from the box.

Applicant's patents which use floating weirs or skimmers include U.S. Pat. No. 8,034,236 for a storm water system having a floating skimmer apparatus attached in a storm water filter box and in U.S. Pat. No. 8,034,234 for a Floatable Skimmer Apparatus with Up-Flow Filter for filtering floatable debris and non-floating pollutants from storm water passing through a storm water drain system. U.S. Pat. No. 8,083,937 teaches a floatable baffle panel and filter apparatus for filtering floatable debris from storm water passing through a storm water drain system vault. A wall having a passageway therethrough has a filter passageway for filter the storm water and a floatable baffle panel covering a second passageway for capturing floatable debris and trash from the storm water. U.S. Pat. No. 8,231,780 is for a Floating Skimmer and Filter Apparatus for filtering floatable debris and non-floating pollutants from storm water passing through a drain system vault. A floatable skimmer has a filtered passageway filtering water passing through the passageway while the floatable skimmer captures floating debris and trash from the storm water.

Other U.S. patents of Applicant relating to storm water systems may be seen in U.S. Pat. No. 7,549,820 for a Curb Opening Filter and U.S. Pat. No. 7,785,464 for Flocculate Dosing Tray and U.S. Pat. No. 8,034,237 for Backwashing Filter Basket and U.S. Pat. No. 8,216,453 for Grate Cover Apparatus and U.S. Pat. No. 6,270,663 for Storm Drain Filter System and U.S. Pat. No. 6,428,692 for In-line Storm Water Drain Filter System and U.S. Pat. No. 6,869,525 for Storm Drain Filter System and U.S. Pat. No. 6,797,162 for a Catch Basin Filter for Storm water Runoff and U.S. Pat. No. 6,979,148 for Golf Course Green Storm Water Filter and U.S. Pat. No. 7,959,799 for a Street Curb Filter Basket System.

SUMMARY OF THE INVENTION

A storm water nutrient separating vault has an articulated floating screen filter basket. The storm water nutrient separating vault has a plurality of walls and a storm water inlet passing thereinto. A floatable filter basket in the nutrient separating vault has an open front end having a scoop thereon for directing floatable debris into the floatable filter basket. The floatable filter basket has a plurality of floats adjustably mounted thereto for floating the filter basket with the rise and fall of the water level in the vault. A pair of tracks having a T-shaped cross-section are mounted generally vertical and parallel to each other with one track mounted to each side of the vault's storm water inlet. Each one of a pair of trucks is swively mounted to the filter basket and each has a plurality of load rollers and a plurality of positioning rollers thereon. Each truck rides on its rollers in one of the tracks to thereby hold the floating filter basket while allowing the floating filter basket to swivel while rising and falling with the water level in the nutrient separating vault. Each truck remains parallel with the track regardless of the angle of the floating filter basket as it moves with the level of water in the vault. Thus a storm water nutrient separating vault has an articulated floating screen filter system therein with guide means to direct floating debris into the basket. Each truck has a side guide plate thereon adjacent the vault's storm water inlet for directing floating debris into the floating basket scoop and floating basket. Each truck is connected to the floatable filter basket with a pivot pin that allows the floatable filter basket to swivel relative to the truck as the truck moves on its track as the water level in the vault rises and falls.

BRIEF DESCRIPTION OF THE DRAWINGS

The accompanying drawings are included to provide further understanding of the invention and are incorporated in and constitute a part of the specification, and illustrate an embodiment of the invention and together with the description serve to explain the principles of the invention.

In the Drawings:

FIG. 2 is a front perspective of FIG. 1;

FIG. 3 is a top view of FIG. 1 with the front wall included;

FIG. 24 is a front perspective view of the truck;

FIG. 25 is a rear perspective view of the truck;

FIG. 26 is a right side elevation of the truck;

FIG. 27 is a left side elevation of the truck;

FIG. 28 is a front elevation of the truck;

FIG. 29 is a rear elevation of truck;

FIG. 30 is a top plan view of the truck;

FIG. 31 is a bottom plan view of the truck; and

DETAILED DESCRIPTION OF EXEMPLARY EMBODIMENT

Figure 1:
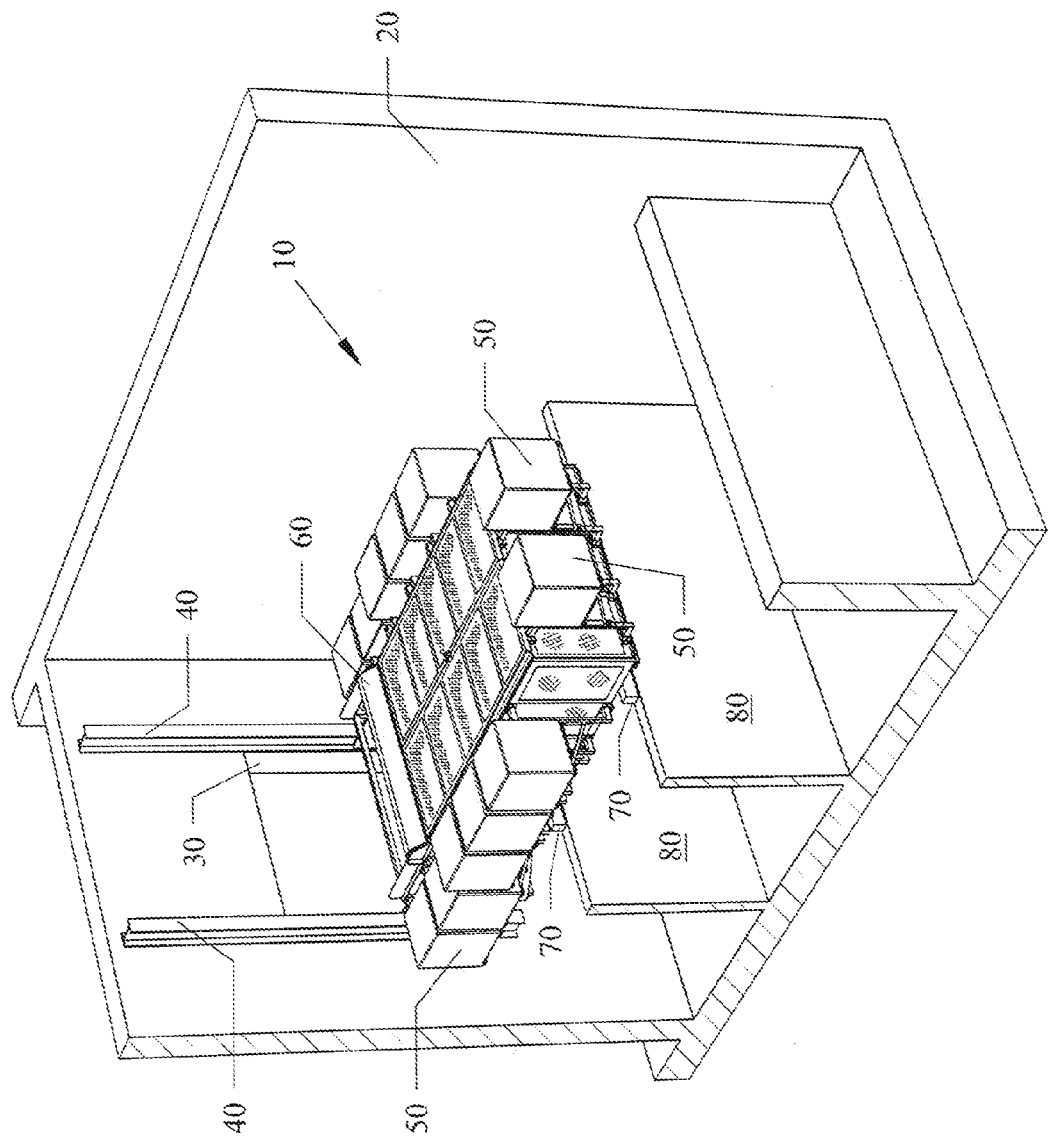
FIG. 1 is a rear perspective of a screen system in a nutrient separating vault with front wall cut away in accordance with the present invention.

A floatable filter basket collects debris entering a storm water filter vault and rises and falls with the water level in the vault. The floatable filter basket is swivelly supported on one end thereof with a pair of trucks having rollers riding on a pair of tracks mounted to the vault walls.

The following description of the present invention uses the following numerals in the drawings, FIGS. 1 through 32, to identify the parts illustrated in the drawings:

10 Floating screen system or basket;
20 Storm water handling vault;
30 Storm water inlet;
40 Screen Track;
50 Float;
60 Scoop;
70 Landing point;
80 Baffle;
90 Debris guide;
100 Swiveling truck assembly;
110 Load Roller;
120 Positioning Roller;
130 Truck side plate;
140 Solid spacer;
150 Truck mounting plate;
160 Rubber spacer;
170 Hex threaded nut;
180 Pivot pin;
190 Shoulder bolt;
200 Water line;
210 Water flow;
220 Float mounting bracket;
230 Float adjustment bracket;
240 Truck swivel action;
250 Flat washer;
260 Floating solids.

As shown in the drawings and especially in FIGS. 1 through 3, a nutrient separating vault 20 has a floating nutrient separating filter basket 10 therein. A plurality of floats 50 are mounted to the filter basket 10 to allow the basket to float as the level of water in the vault 20 rises and falls. In low water periods the filter basket 10 can sit on baffles 80 in the vault 20. As will be seen in the drawings, the floats 50 are attached to the filter basket at different heights. The filter basket 10 is held in position in the vault by a pair of trucks 100 which are attached to rails 40 to guide the trucks 100 as the filter basket 10 rises and falls with the water in the vault. The basket 10 has a scoop 60 on the front end thereof which faces the storm water inlet 30 to the vault. Storm water enters the vault 20 through the inlet 30 and passes into the screen filter basket 10 which captures debris and trash from the storm water. The trucks 100 each have a debris guide 90 on one side thereof which rises and falls with the water level in the vault 20 and guides debris entering vault in the storm water into the filter basket 10. The trucks 100 have the filter basket 10 attached thereto with a swivel attachment, such as a pivot pin, as hereafter described to allow the filter basket 10 to tilt or swivel as it moves up and down with rise and fall of the water level in the vault 20. Each of the two tracks 40 has a T-shaped cross-section and is positioned to either side and adjacent the storm water inlet 30 to maintain the scoop 60 facing into the inlet 30 as the floating screen basket 10 rises and falls with the water level in the vault 20. In addition each truck 100 has the side plate debris guide 90 mounted to the truck so as to be adjacent each side of the storm water inlet 30 to guide debris entering with the storm water into the scoop 60 and into the floating screen basket 10.

The truck and track system of this invention has the strength and durability to properly position the screen system within the concrete vault 20. The truck assembly 100 has many rollers 110 and 120 that reduce friction of the truck as it moves vertically along the screen track 40. The screen track 40 has the profile shape typical of an I-beam.

Figure 3A:
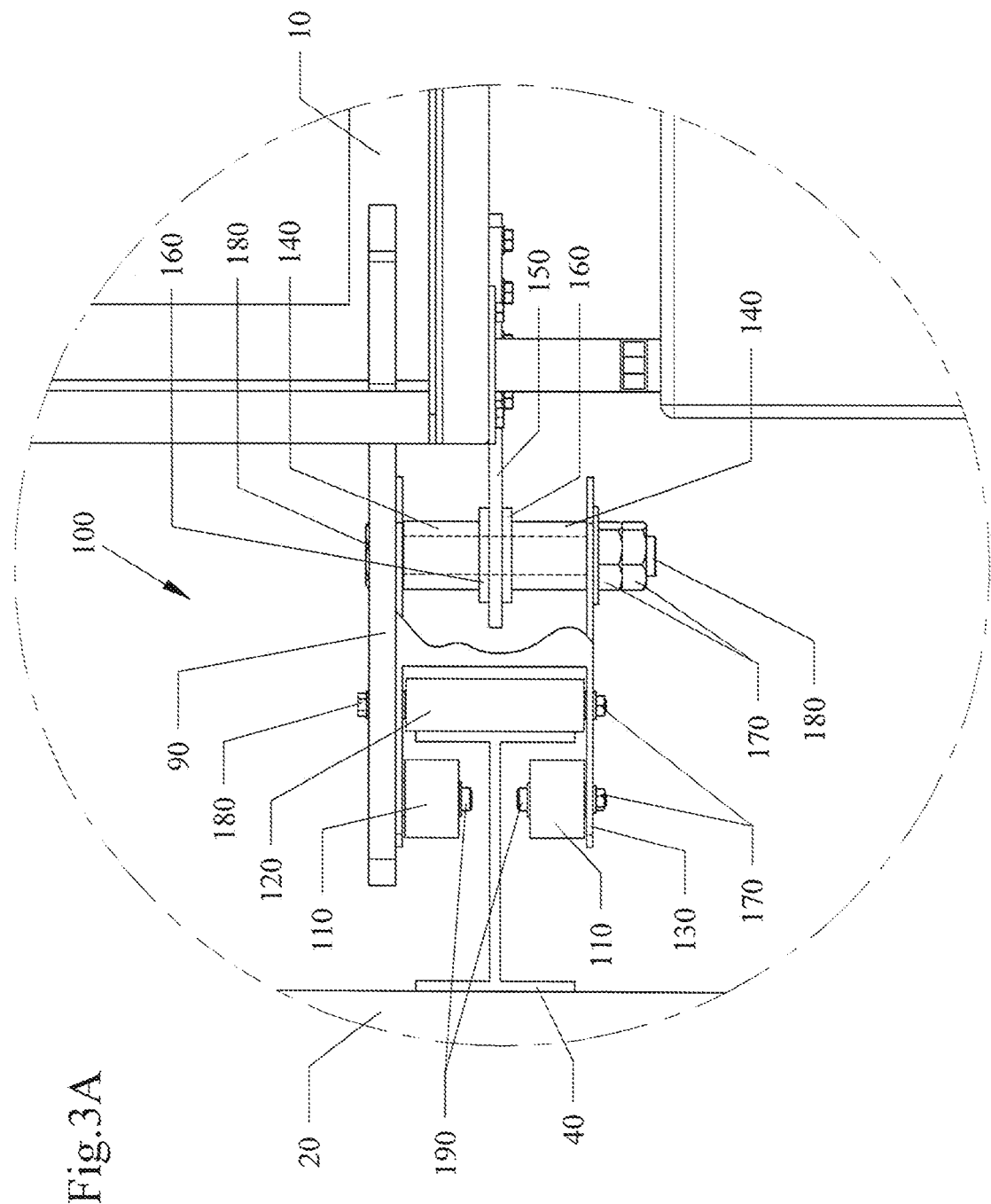
FIG. 3A is a detail of a truck with the guide plate cutaway.

The truck assembly 100 is in line with the screen track 40 and the rollers 110 on each side of the truck are even with each other on each side of the track, when water is flowing and pushing against the screen basket 10, the load force on each load roller 110 is equally distributed on each side of the truck 100 as shown in FIG. 3A. The positioning rollers 120 help to keep the track 40 properly positioned within the truck and to help minimize potential friction within the truck. The pivot pin 180 enables the basket to articulate on the truck along two perpendicular axes. The weight distribution within the screen basket 10 will likely vary significantly and effect angle at which the screen basket 10 floats. The pivot pin 180 enables each truck 100 to remain parallel with each screen track 40 regardless of the angle of the screen basket 10. This enables all of the load rollers 110 to have an equal amount of force exerted on them whether water is flowing or the water is static. Because the force is always equally distributed between all the load rollers 110, a single or group of load rollers will not overload and fail as a result as seen in FIGS. 3A, 7, 8, 22, 23 and 32.

The vault 20 wall that the screen track 40 is mounted to is typically not perfectly flat, because the truck 100 with its swiveling connection can let the basket articulate thereon so that the truck 100 can compensate for a track mounting surface that is not flat. This enables all the load rollers 110 to have an equal amount of force exerted on them whether water is flowing or the water is static. Because the force is always equally distributed between all the load rollers 110, a single or group of load rollers will not overload and fail as a result.

The truck mounting plate 150 has a hole that receives the pivot pin 180. This hole is larger than the diameter of the pivot pin 180 so that the angle of the pivot pin can change relative to the mounting plate 150. The solid spacers 140 and the rubber spacers 160 position the mounting plate so that it is central within the truck 100. The rubber spacers 160 are compressible to enable the pivot pin 180 to articulate within the truck 100 while keeping the mounting plate 150 central within the truck as seen in FIGS. 3A, 24, 25, 26, 27, 29. The mounting plate 150 is sized to allow for the attachment to the screen basket to be spread out over an area. Because the attachment area is relatively large, the force exerted by flowing storm water is also spread out which reduces the likelihood for the screen basket to be distorted as seen in FIGS. 22, 23, 26, 25.

The tracks 40 have a T-shaped cross-section and can be of any length. The trucks 100 will be able to travel vertically along the track any specified distance as seen in FIGS. 4, 5, 6, 10, 11.

Attached and located on the central side of each truck 100 is a debris guide 90 which acts to direct debris into the screen basket 10. The debris guide 90 also acts to prevent debris from being involved with rollers 110 and 120 within each truck 100. The debris guide 90 has a shape that allows the floating screen basket 10 to articulate without binding against the debris guide 90 as seen in FIGS. 2, 3, 3A, 5, 7, 8, 9, 11, 12, 14, 15, and 18.

The scoop 60 on the front of the screen basket 10 directs floating debris into the screen basket 10 even when the water flows over the top of the screen basket. It is important for the screen basket 10 to be able to be overtopped by flowing storm water so that head loss caused by the screen system can be minimized to prevent flooding upstream. The scoop 60 is positioned adjacent to the storm water inlet 30 of the storm water vault 20. The scoop 60 has a relatively large opening above the top of the screen basket 10. This opening acts as a conveyance for water flow so that the flowing water can bypass the screen basket 10 to minimize head loss caused by the screen basket in the event that the screen becomes impacted, or to pass high water flows as seen in FIGS. 1, 2, 4, 5, 6, 7, 8, 10, 11, 12, 14, 15, 16, and 18.

The top edge of the scoop 60 extends above the screened lids of the screen basket so that the lids will be involved with flowing water before the water flow overtops the scoop 60. Essentially, the screened lids of the screen system are at a lower hydraulic grade line than the top of the scoop 60. The scoop 60 can be either made from a screen material or a slick non-porous material. The portion of the scoop 60 that spans across the screen basket 10 and is perpendicular to the direction of water flow, can be angled to allow floating debris to more easily pass into the screen basket. By angling this portion of the scoop 60, friction is minimized between the scoop 60 and the inside of the screen basket 10 system which enables floating solids 260 to more easily flow into the screen basket 10 where they will remain captured.

The floating screen basket 10 is able to automatically adjust to changing water levels within the storm water handling vault 20. The water levels within the storm water handling vault 20 are typically influenced by the rate of water flow, an adjacent lake or river level, or be tidally influenced. Having a screen system that has a short vertical dimension and able to be move up and down with the changing hydraulic grade within the storm water handling vault 20 has less potential head loss than a tall screen system that is fixed in place. Less potential head loss means that the floating screen system will be less likely to cause flooding upstream from the treatment system, and the short screen system will be able to effectively do the job of a tall screen system.

As seen in FIGS. 1,2,3,4,5,11,15,18, 19,20 and 21, a plurality of floats 50 are positioned around the perimeter of the floating screen basket 10. Having multiple floats helps to spread out the forces involved in floating the screen basket which simplifies structural considerations. It also enables the use of floats 50 to be of different sizes and shapes. The vertical position of the floats 50 can also vary depending on buoyancy requirements. The floats 50 are mounted to the screen basket by means of float mounting brackets 220 and float adjustment brackets 230. Each float mounting bracket 220 attaches directly to a float 50 and also to a float adjustment bracket 230. The float adjustment bracket 230 joins the float bracket 220 to the screen basket 10. The float adjustment bracket 230 has the ability to attach to the float mounting bracket 220 at multiple locations along a vertical line. This gives each float 50 the ability to be individually vertically adjustable. Having multiple floats that are vertically adjustable enables the screen basket 10 to have adjustable buoyancy. The ability to adjust the screen basket 10 buoyancy in this way enables the horizontal attitude of screen basket to be adjusted for optimal performance, and to be readjusted at a later date if a change in buoyancy is desired as may be seen in FIGS. 15, 16, 17, 18, 19, 20, and 21.

Figure 4:
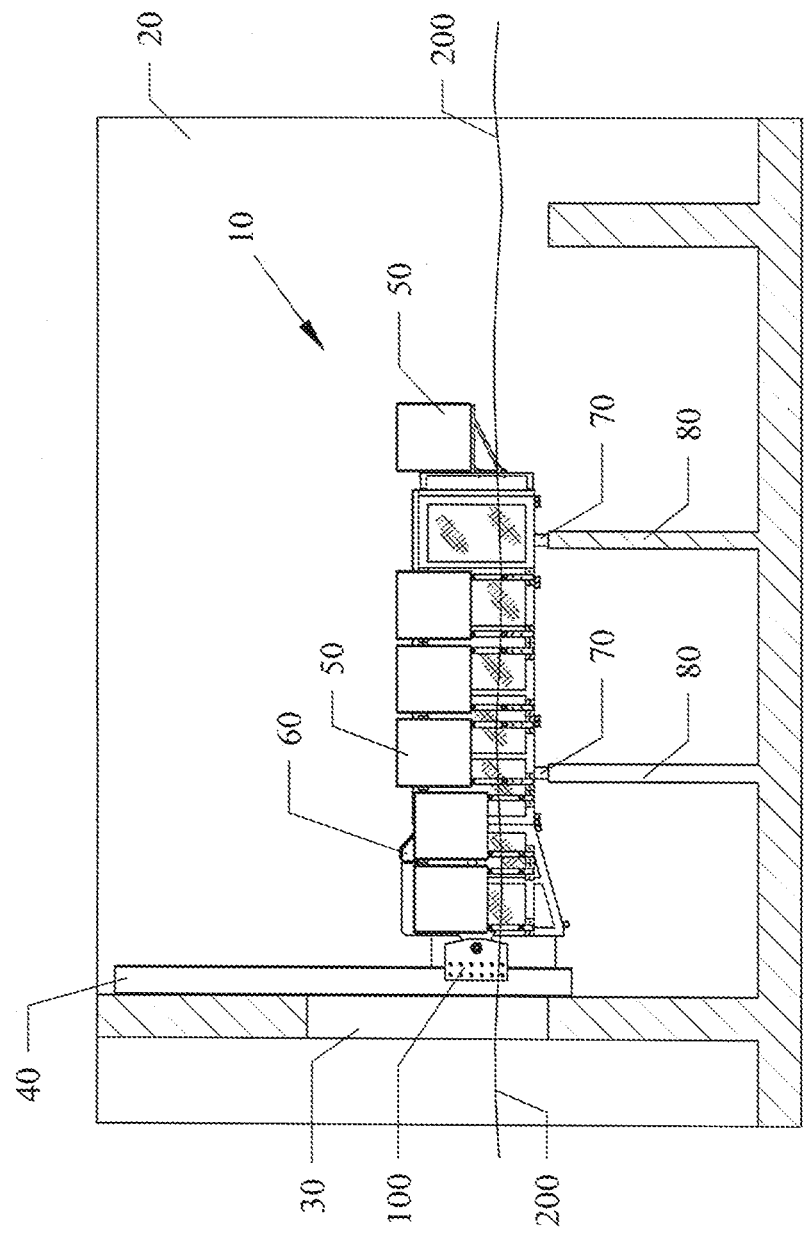
FIG. 4 is a sectional view of FIG. 1 with the screen basket resting on vault baffle walls.
Figure 5:
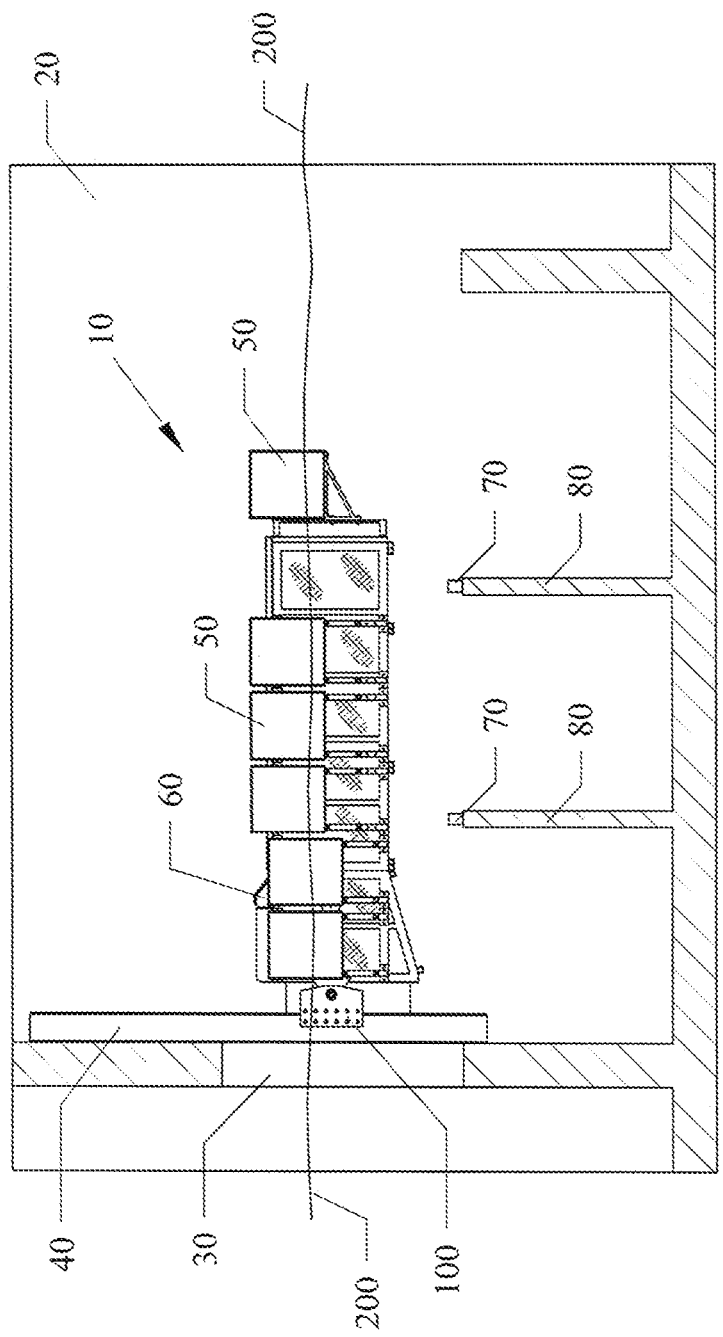
FIG. 5 is the sectional view of FIG. 4 having the screen basket floating adjacent to the vault inlet.
Figure 6:
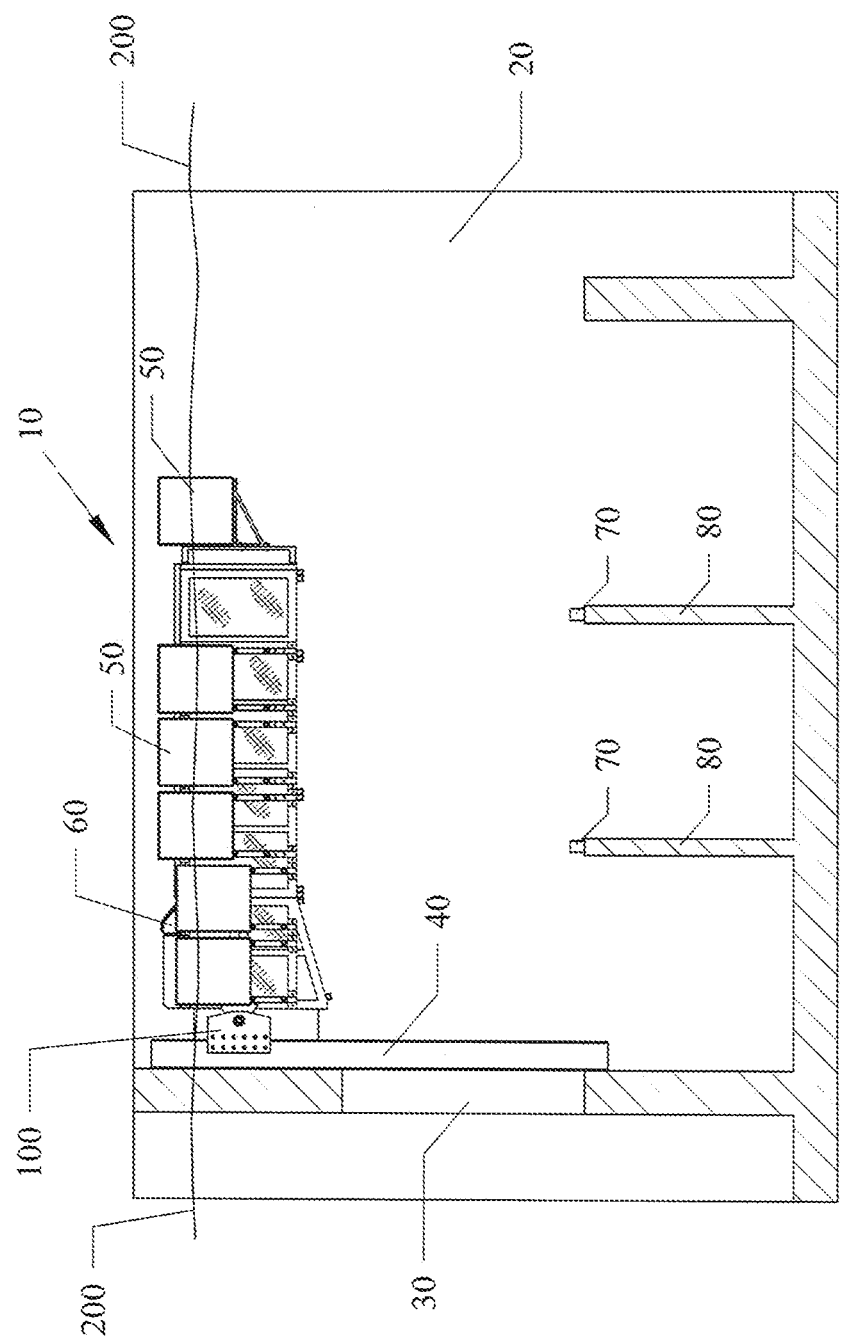
FIG. 6 is the sectional view of FIG. 4 having the basket floating above vault inlet.
Figure 7:
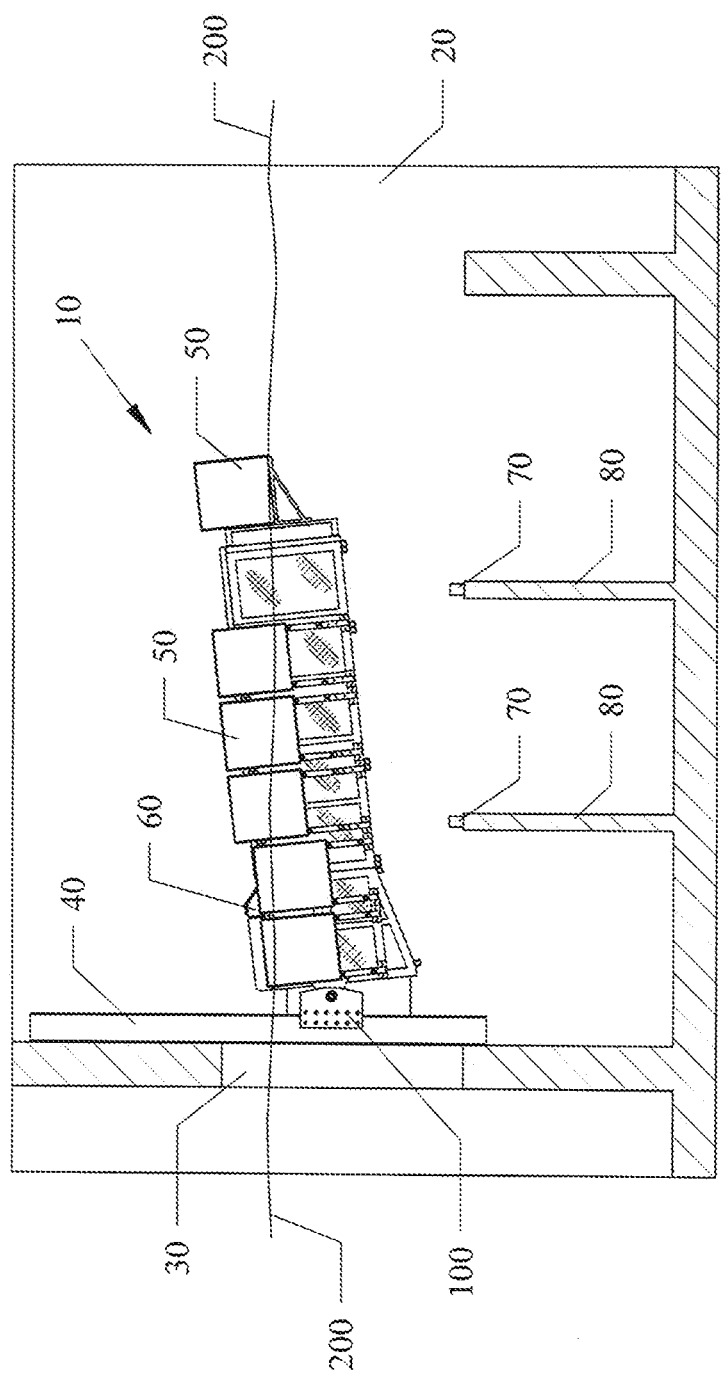
FIG. 7 is the sectional view of FIG. 5 having the screen basket swiveled up under the influence of water turbulence.
Figure 8:
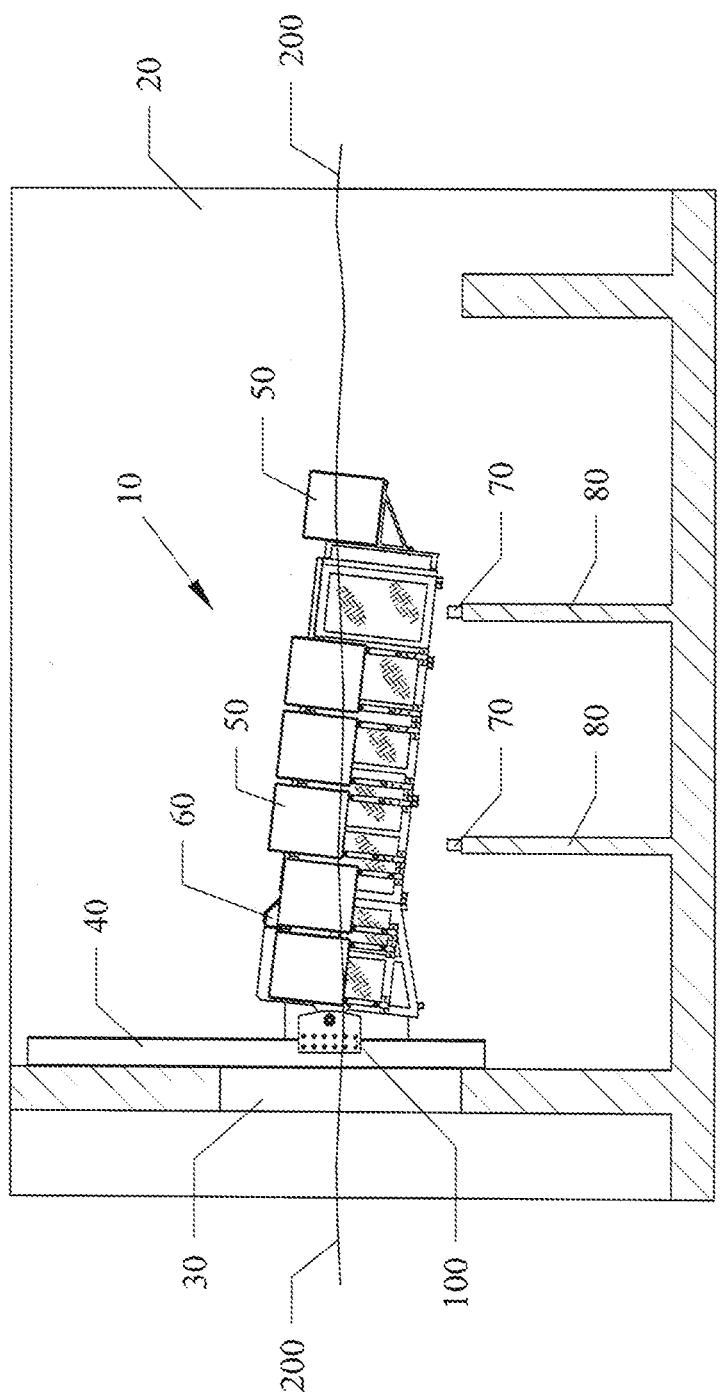
FIG. 8 is the sectional view of FIG. 5 having the screen basket swiveled down under the influence of water turbulence.
Figure 9:
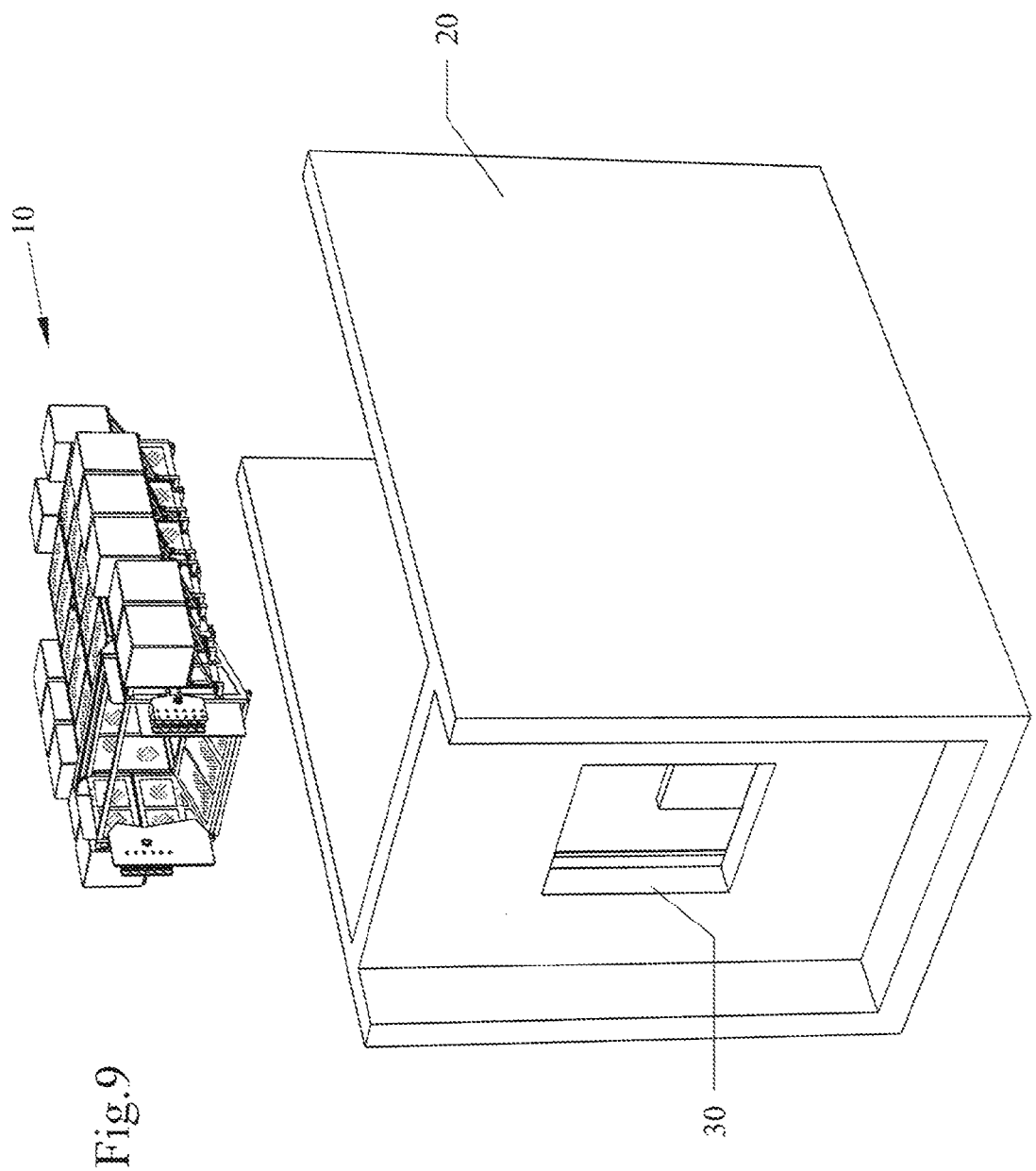
FIG. 9 is a front perspective view of the screen basket with the screen system lifted out of vault.
Figure 10:
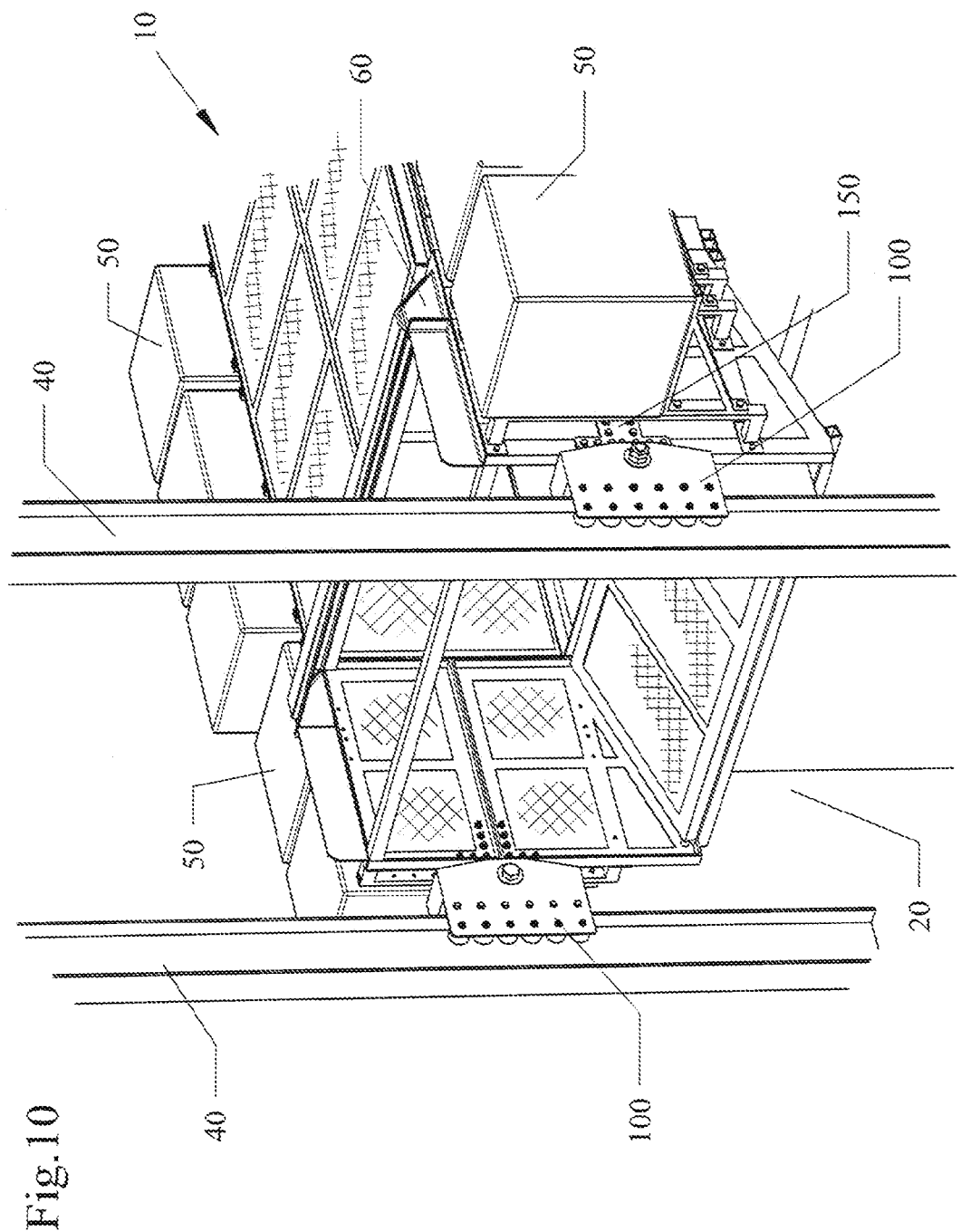
FIG. 10 is partial front perspective view showing the trucks engaged to tracks.
Figure 11:
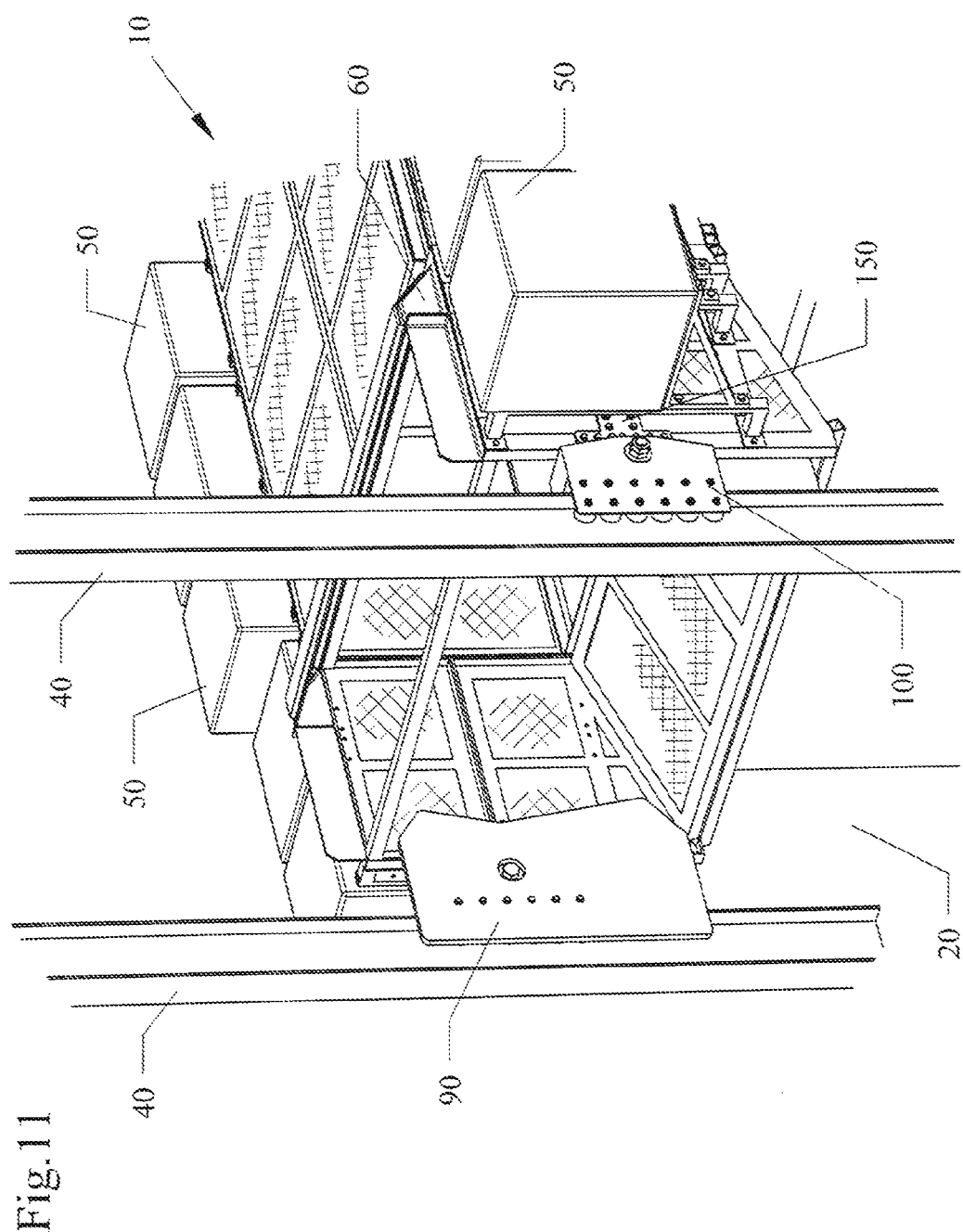
FIG. 11 is a partial perspective view of FIG. 10 with the debris guides mounted onto the trucks.
Figure 12:
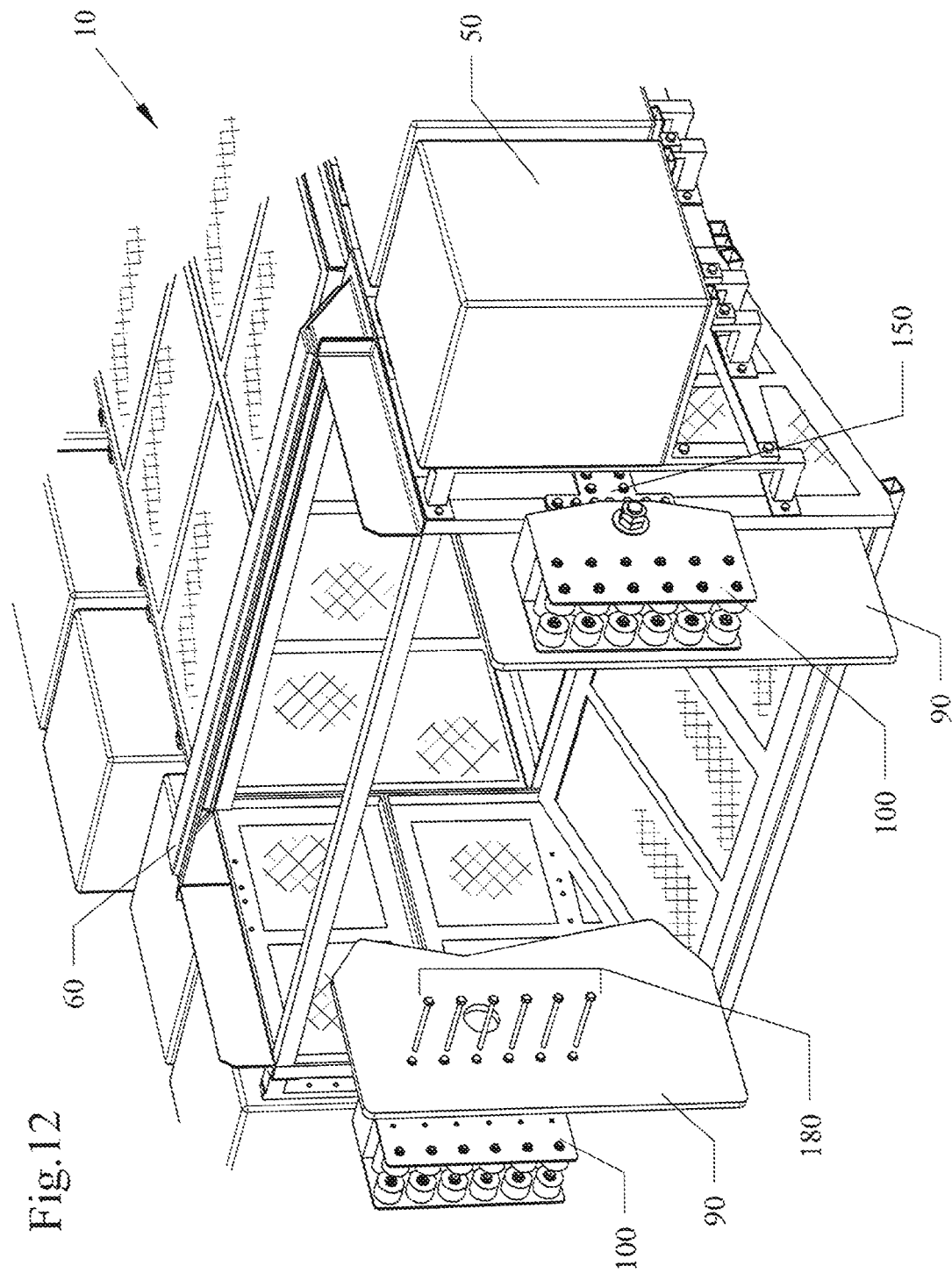
FIG. 12 is the perspective view of FIG. 11 having one debris guide exploded from the truck.
Figure 13:
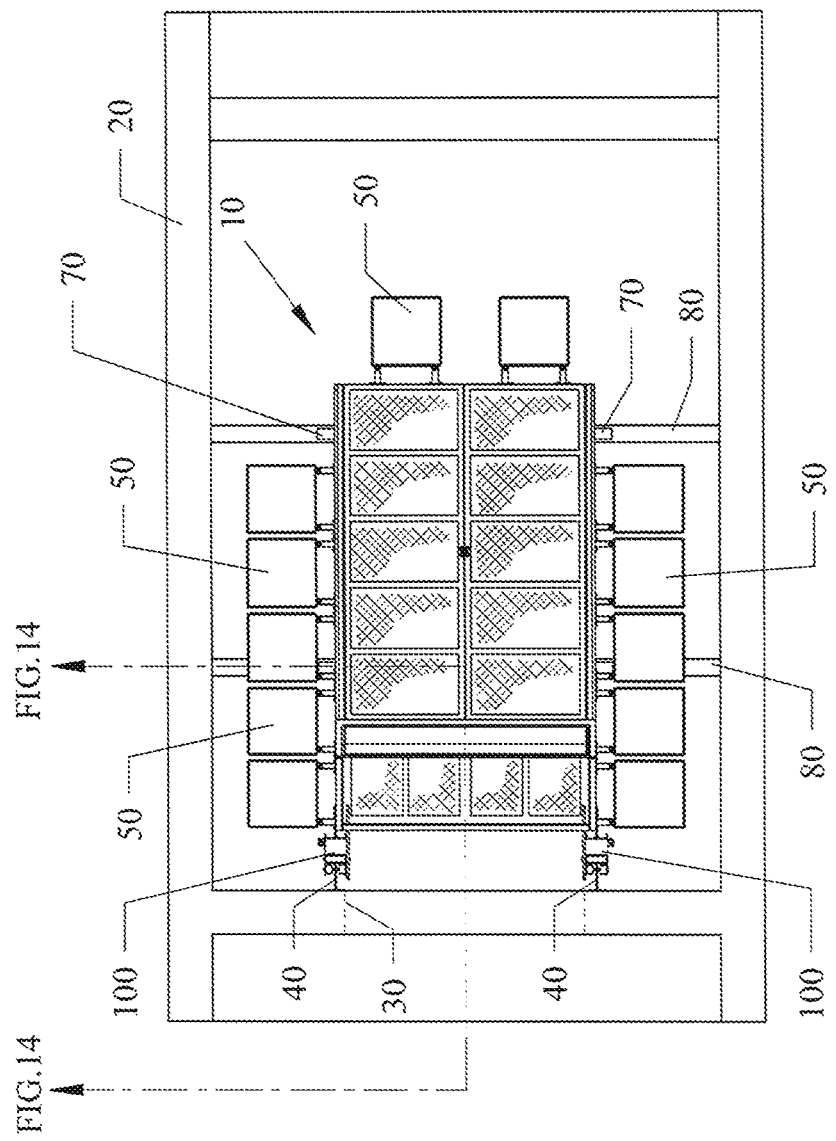
FIG. 13 is a top view of the screen basket in the vault.
Figure 14:
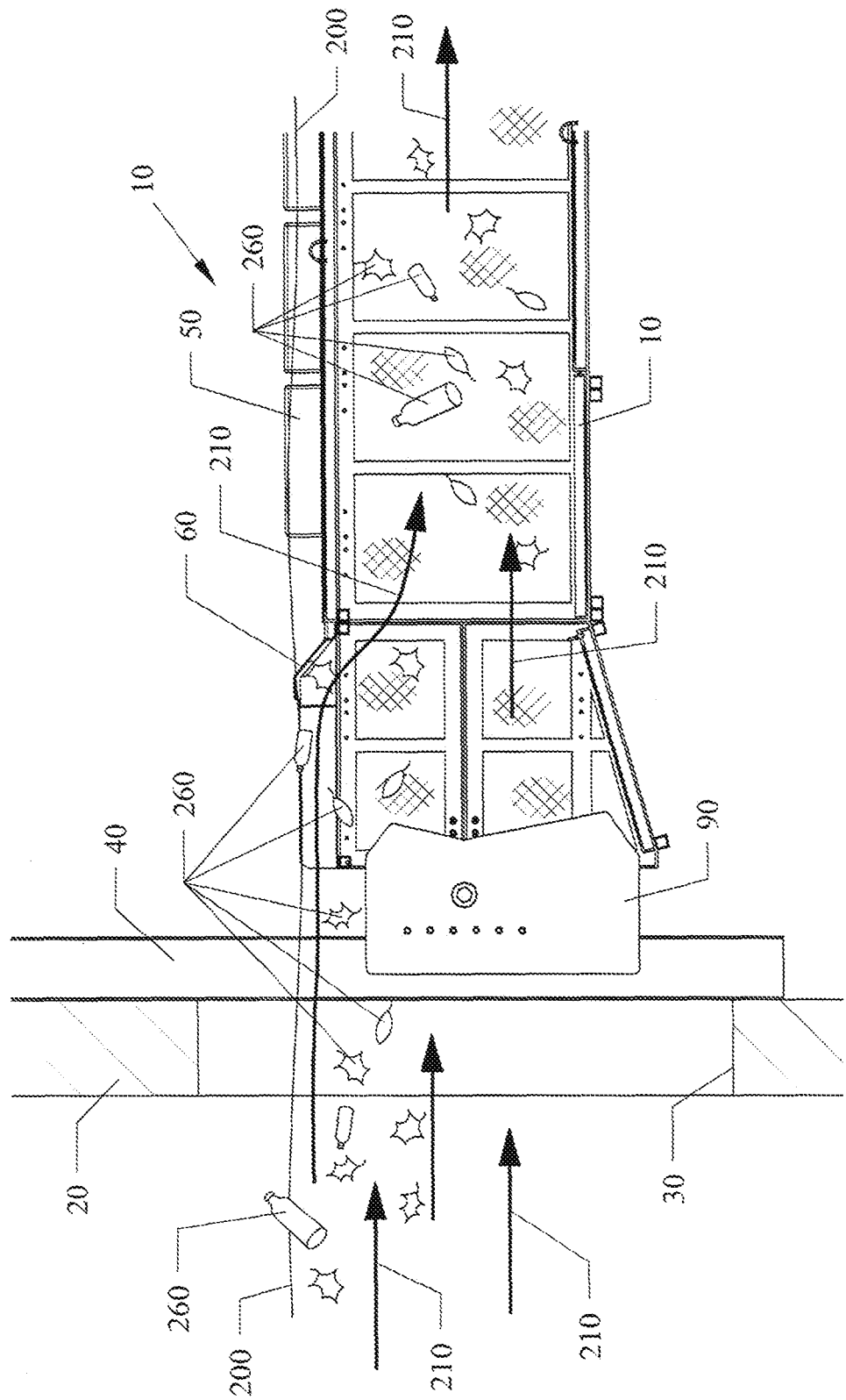
FIG. 14 is sectional view of the scoop.
Figure 15:
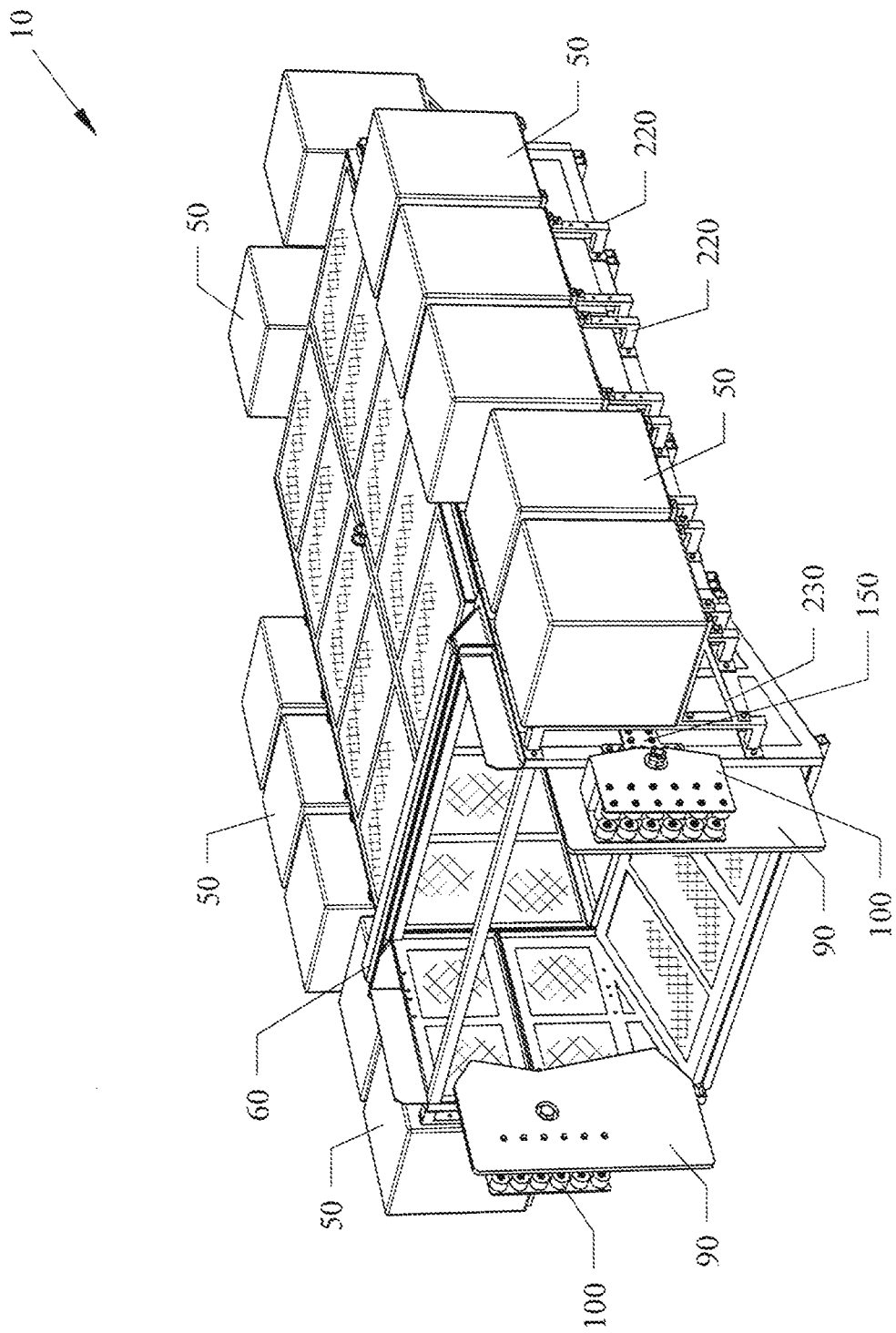
FIG. 15 is a front perspective view of the screen basket.
Figure 16:
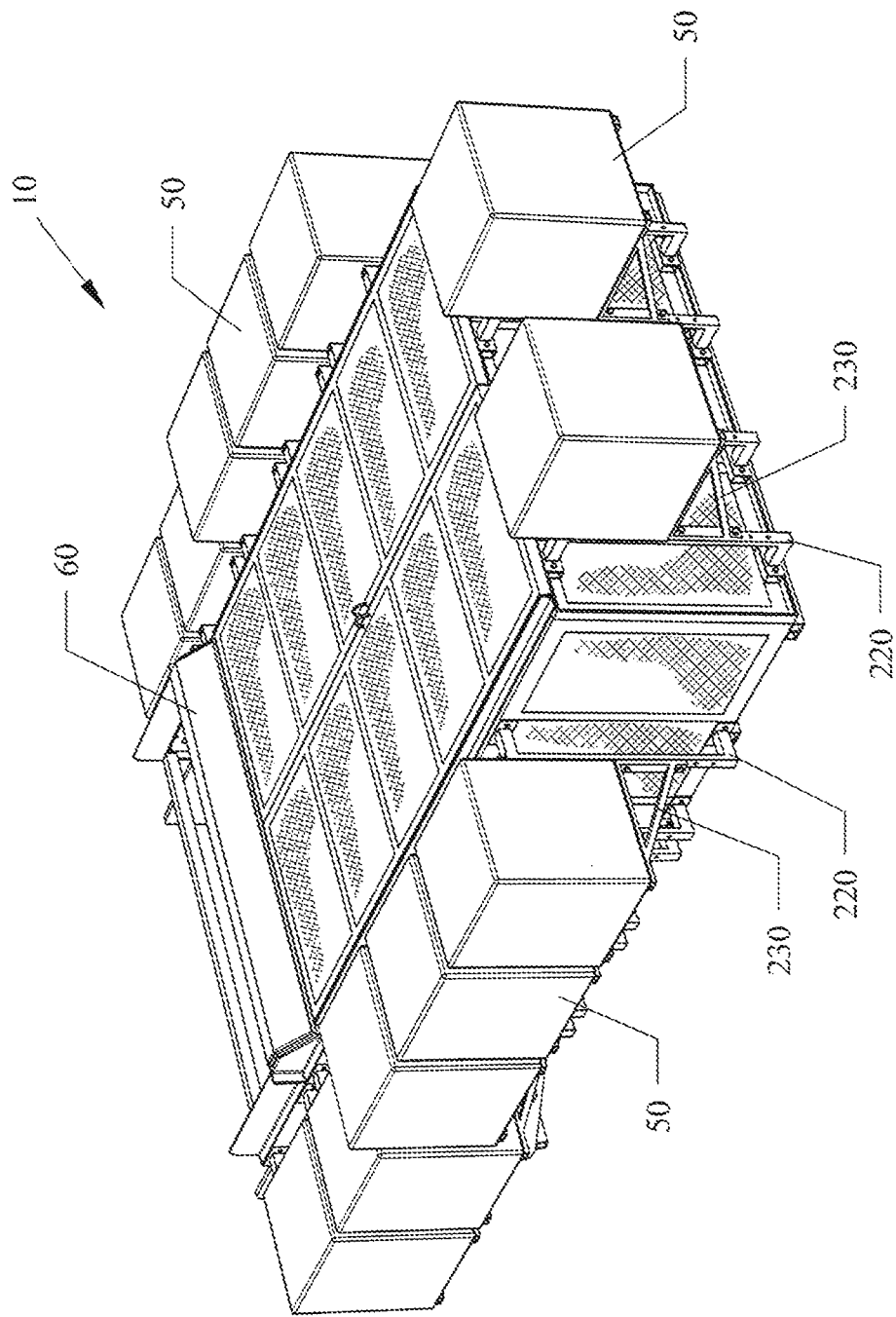
FIG. 16 is a rear perspective of FIG. 15.
Figure 17:
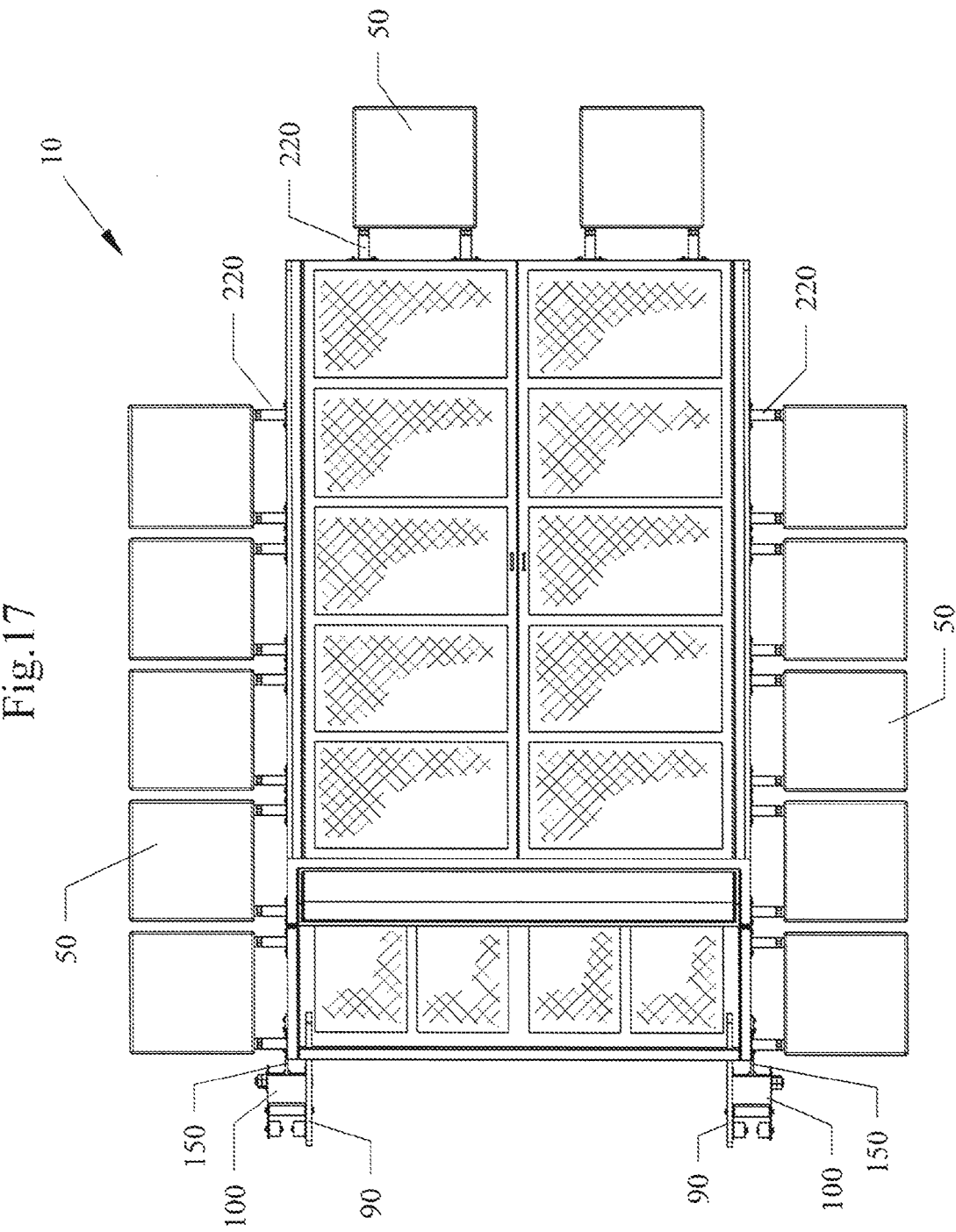
FIG. 17 is a top view of FIG. 15.
Figure 18:
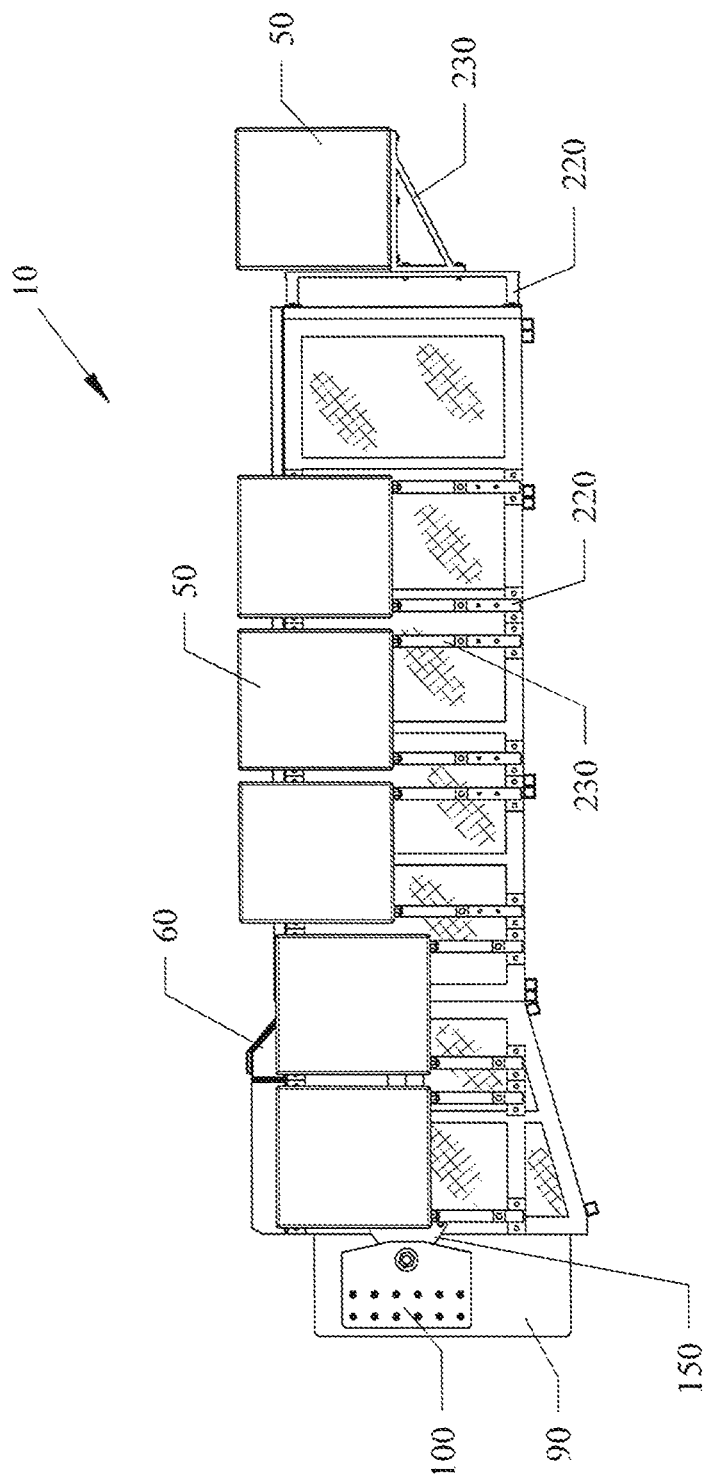
FIG. 18 is a side view of FIG. 15.
Figure 19:
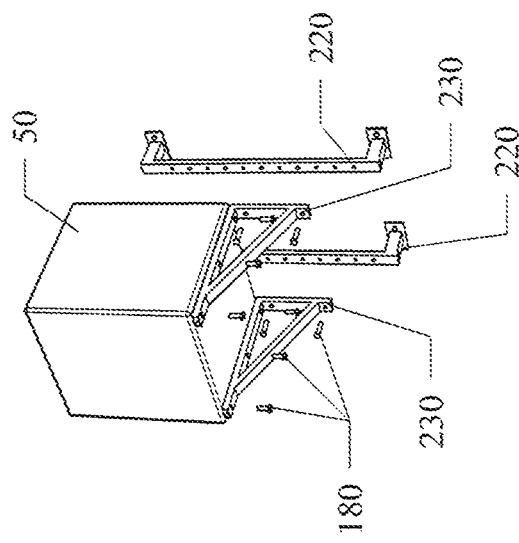
FIG. 19 is an exploded bottom perspective of an adjustable float and bracket assembly.
Figure 20:
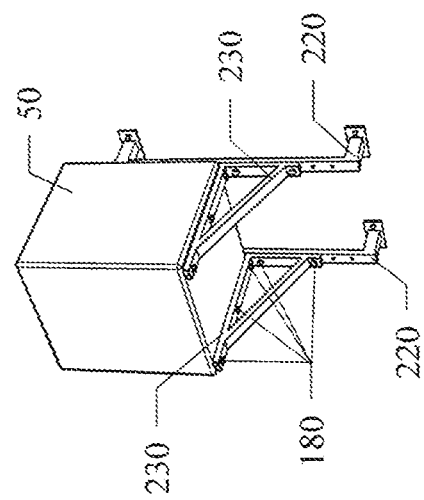
FIG. 20 is a bottom perspective of the adjustable float/bracket assembly showing the bracket adjusted up.
Figure 21:
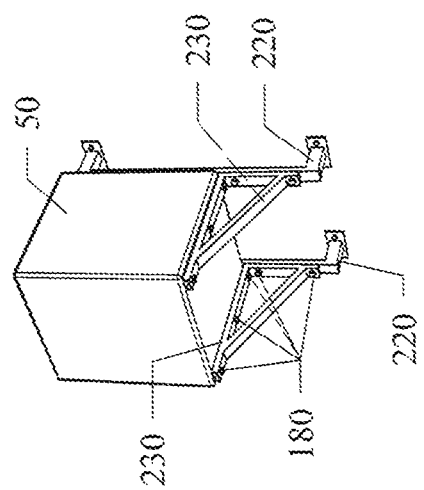
FIG. 21 is a bottom perspective view of the adjustable float bracket assembly of FIG. 20 with the bracket adjusted down.
Figure 22:
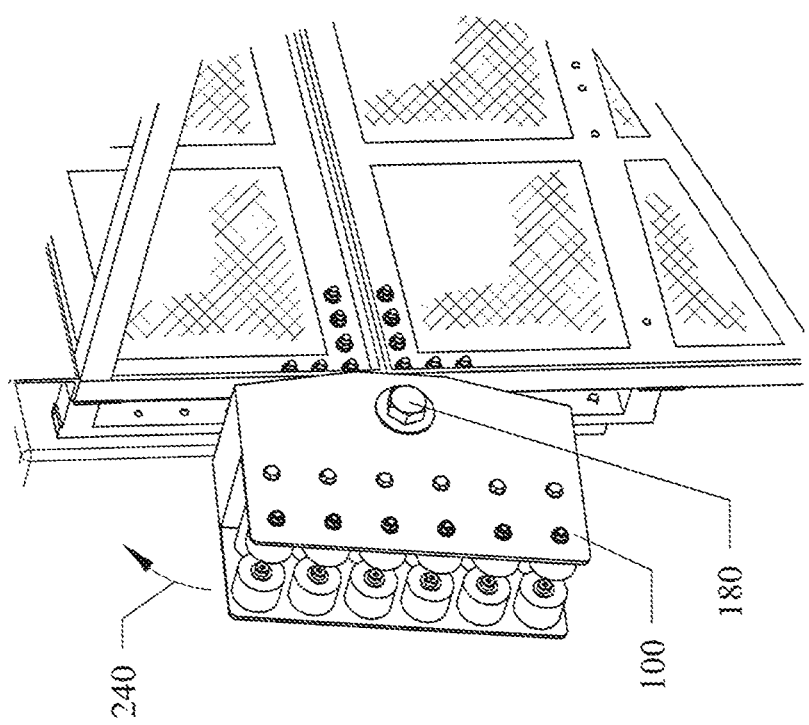
FIG. 22 is a front perspective detail of the screen basket with truck swiveled up.
Figure 23:
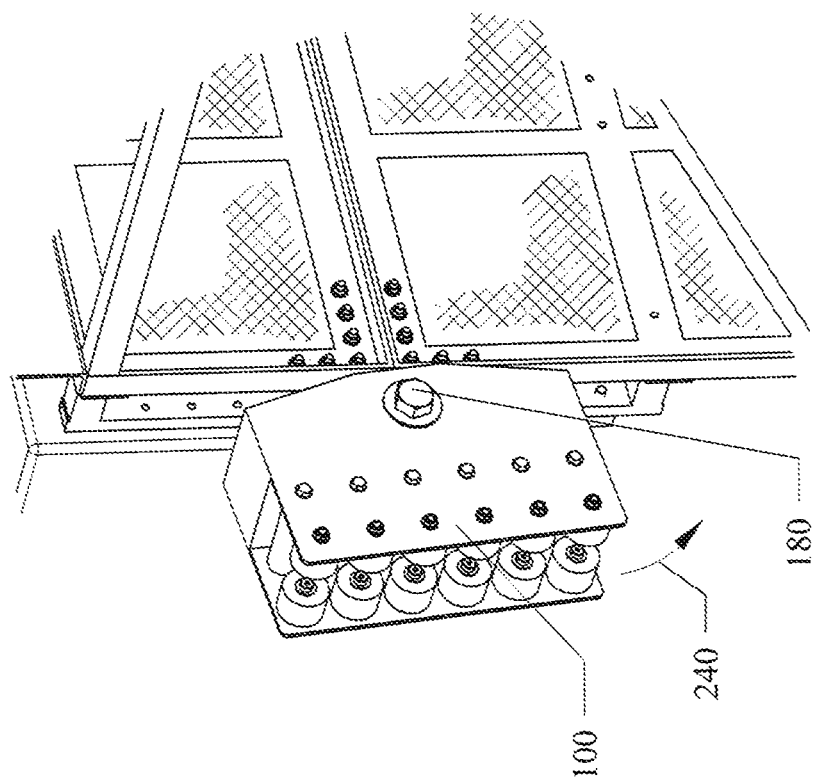
FIG. 23 is a front perspective detail of the screen basket with truck with the truck swiveled down.
Figure 32:
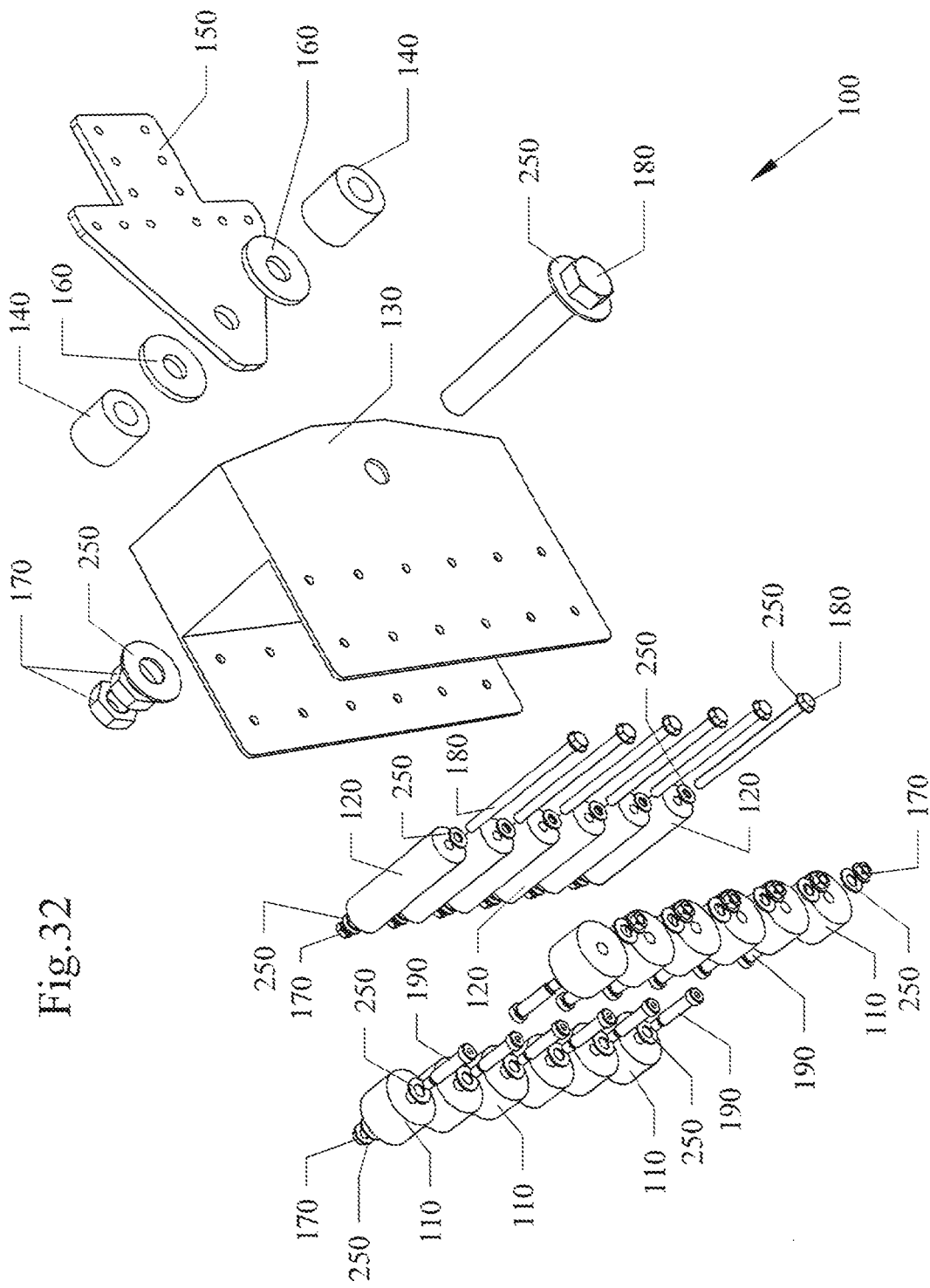
FIG. 32 is an exploded perspective of the truck.

The floats 50 can be adjusted vertically so that the top of the float extends beyond the top of the screen basket. Having the floats 50 extend above the screen basket 10 effectively maximizes the buoyancy when the hydraulic grade line approaches the top of the screen basket. This helps to prevent the screen basket 10 from floating upward with a rising hydraulic grade line until just before the screen basket 10 is about to be overtopped by flowing water as seen in FIGS. 4, 14, and 18.

It should be clear at this time that an articulated floating screen filter system for a nutrient separating vault has been provided. However the present invention is not to be considered limited to the forms shown which are to be considered illustrative rather than restrictive.

I claim:

1. A storm water nutrient separating vault having an articulated floating screen filter system comprising:
    a storm water nutrient separating vault having a plurality of walls and a storm water inlet passing through one said wall;
    a floatable filter basket located in said nutrient separating vault, said floatable filter basket having an open front end and having a plurality of floats mounted thereto for floating said filter basket with the rise and fall of the water level in the nutrient separating vault;
    a pair of tracks mounted vertically to said nutrient separating vault adjacent said storm water inlet;
    a pair of trucks, each truck being swivelly mounted to said filter basket, each said swivelly mounted truck having a plurality of rollers thereon and each said truck riding on said rollers in one said track holding said floating filter basket while allowing the angle at which the floating filter basket floats to vary while each said truck remains parallel with the track regardless of the angle of the floating screen as it moves with the level of water in the vault;
    whereby a storm water nutrient separating vault has an articulated floating screen filter system therein.

2. The storm water nutrient separating vault having an articulated floating screen filter system in accordance with claim 1 in which said floating filter basket open front end has a scoop thereon for capturing and directing floating debris into said floating filter basket.

3. The storm water nutrient separating vault having an articulated floating screen filter system in accordance with claim 2 in which said track has a generally T-shaped cross section.

4. The storm water nutrient separating vault having an articulated floating screen filter system in accordance with claim 3 in which each truck plurality of rollers includes a plurality of load rollers positioned on each side of one said track.

5. The storm water nutrient separating vault having an articulated floating screen filter system in accordance with claim 4 in which each truck plurality of rollers includes a plurality of positioning rollers positioned perpendicular to said load rollers on each track and rolling on the face of said track.

6. The storm water nutrient separating vault having an articulated floating screen filter system in accordance with claim 5 in which each of said floating filter basket plurality of floats is generally vertically adjustably mounted on said floating filter basket.

7. The storm water nutrient separating vault having an articulated floating screen filter system in accordance with claim 6 in which each said truck has a side guide plate thereon adjacent the storm water inlet to said storm water nutrient separating vault inlet for directing floating debris into said floating basket scoop and floating basket.

8. The storm water nutrient separating vault having an articulated floating screen filter system in accordance with claim 7 in which each truck is connected to said floatable filter basket with a pivot pin that allows said floatable filter basket to swivel relative to said truck as said truck moves on said track as the water level in said vault rises or falls.

9. The storm water nutrient separating vault having an articulated floating screen filter system in accordance with claim 8 in which said track has a generally T-shaped cross section having a front cross plate and in which each of said plurality of load rollers are mounted behind said cross plate on both sides of said track.

10. The storm water nutrient separating vault having an articulated floating screen filter system in accordance with claim 9 in which each said truck positioning roller is mounted across the front of said cross plate.

11. A storm water nutrient separating vault having an articulated floating screen filter system comprising:
    a storm water nutrient separating vault having a plurality of walls and a storm water inlet passing through one said wall;
    a floatable filter basket located in said nutrient separating vault, said floatable filter basket having an open front end having a scoop thereon for directing floatable debris into said floatable filter basket, said floatable filter basket having a plurality of floats adjustably mounted thereto for floating said filter basket with the rise and fall of the water level in the nutrient separating vault;
    a pair of tracks mounted generally vertical and parallel to each other, one said track mounted to said nutrient separating vault on each side of said storm water inlet in said nutrient separating vault;
    a pair of trucks, each truck being swivelly mounted to said filter basket, each said truck having a plurality of load rollers thereon and a plurality of positioning rollers thereon and each said truck riding on said rollers in one said track to thereby allow said floating filter basket to swivel as the floating filter basket floats in said nutrient separating vault while each said truck rises and falls in said tracks with said floating filter basket as it moves with the level of water in the vault;
    whereby a storm water nutrient separating vault has an articulated floating screen filter system therein.

12. The storm water nutrient separating vault having an articulated floating screen filter system in accordance with claim 11 in which each said truck has a side guide plate thereon adjacent the storm water inlet to said storm water nutrient separating vault inlet for directing floating debris into said floating basket scoop and floating basket.

13. The storm water nutrient separating vault having an articulated floating screen filter system in accordance with claim 12 in which each said truck is connected to said floatable filter basket with a pivot pin that allows said floatable filter basket to swivel relative to said truck as said moves on said one track as the water level in said vault rises and falls.

14. The storm water nutrient separating vault having an articulated floating screen filter system in accordance with claim 13 in which said track has a generally T-shaped cross section having a front cross plate and in which each of said plurality of load rollers are mounted behind said cross plate on both sides of said track.

15. The storm water nutrient separating vault having an articulated floating screen filter system in accordance with claim 14 in which each said truck positioning roller is mounted across the front of said cross plate.

* * * * *